(12) United States Patent
Jakaboski et al.

(10) Patent No.: US 7,908,970 B1
(45) Date of Patent: Mar. 22, 2011

(54) DUAL INITIATION STRIP CHARGE APPARATUS AND METHODS FOR MAKING AND IMPLEMENTING THE SAME

(75) Inventors: Juan-Carlos Jakaboski, Albuquerque, NM (US); Steven N. Todd, Rio Rancho, NM (US); Stephen Polisar, Albuquerque, NM (US); Chance Hughs, Tijeras, NM (US)

(73) Assignee: Sandia Corporation, Albuquerque, NM (US)

( * ) Notice: Subject to any disclaimer, the term of this patent is extended or adjusted under 35 U.S.C. 154(b) by 3 days.

(21) Appl. No.: 11/938,868

(22) Filed: Nov. 13, 2007

(51) Int. Cl.
*F42B 1/00* (2006.01)
(52) U.S. Cl. .................. 102/306; 102/475
(58) Field of Classification Search .......... 102/475, 102/306, 309, 307, 314
See application file for complete search history.

(56) References Cited

U.S. PATENT DOCUMENTS

| | | | |
|---|---|---|---|
| 3,076,408 A * | 2/1963 | Poulter et al. ............ 89/1.14 |
| 3,628,455 A * | 12/1971 | Nelson ............ 102/202.5 |
| 4,664,033 A * | 5/1987 | Burkdoll et al. ............ 102/275.2 |
| 5,505,631 A * | 4/1996 | Schauer et al. ............ 439/188 |
| 6,220,166 B1 * | 4/2001 | Cherry ............ 102/305 |
| 6,438,191 B1 * | 8/2002 | Bickes et al. ............ 376/308 |
| 6,584,905 B1 * | 7/2003 | Snyder ............ 102/202.7 |
| 6,817,297 B1 | 11/2004 | Greene et al. |
| 6,865,990 B1 * | 3/2005 | Greene et al. ............ 102/309 |
| 6,966,263 B1 | 11/2005 | Greene et al. |
| 7,000,545 B2 * | 2/2006 | Sansolo ............ 102/331 |
| 7,357,083 B2 * | 4/2008 | Takahara et al. ............ 102/530 |
| 2005/0081524 A1 * | 4/2005 | Gregory et al. ............ 60/632 |

* cited by examiner

*Primary Examiner* — Bret Hayes
*Assistant Examiner* — Reginald Tillman, Jr.
(74) *Attorney, Agent, or Firm* — Carol I Ashby

(57) ABSTRACT

A Dual Initiation Strip Charge (DISC) apparatus is initiated by a single initiation source and detonates a strip of explosive charge at two separate contacts. The reflection of explosively induced stresses meet and create a fracture and breach a target along a generally single fracture contour and produce generally fragment-free scattering and no spallation. Methods for making and implementing a DISC apparatus provide numerous advantages over previous methods of creating explosive charges by utilizing steps for rapid prototyping; by implementing efficient steps and designs for metering consistent, repeatable, and controlled amount of high explosive; and by utilizing readily available materials.

19 Claims, 33 Drawing Sheets

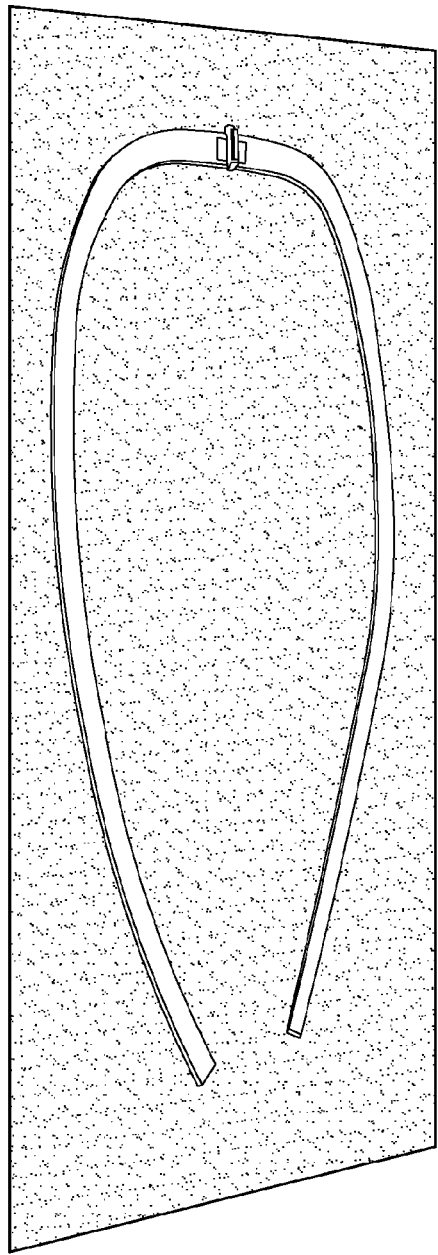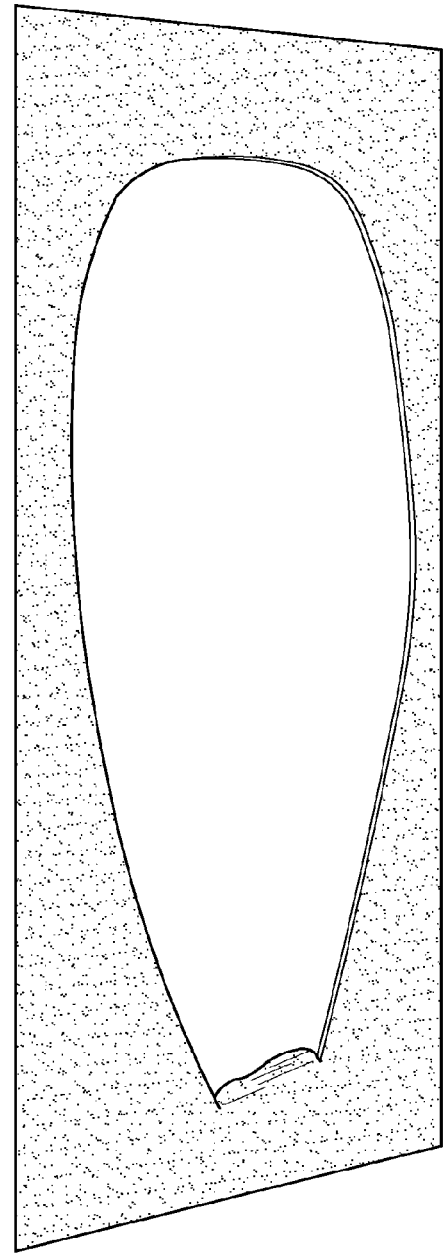
Figure 21A.                    Figure 21B.

DUAL INITIATION STRIP CHARGE APPARATUS AND METHODS FOR MAKING AND IMPLEMENTING THE SAME

STATEMENT REGARDING FEDERALLY SPONSORED RESEARCH OR DEVELOPMENT

This invention was developed under Contract DE-AC04-94AL85000 between Sandia Corporation and the U.S. Department of Energy. The U.S. Government has certain rights in this invention.

FIELD OF THE INVENTION

The present invention relates generally to the field of creating fragment-free openings in metallic objects such as plates, housings, enclosures, drums, boxes, panels, or similar, with the use of explosive charges and, more specifically, with a novel dual initiation apparatus and methods for making and implementing the same.

BACKGROUND OF THE INVENTION

The use of explosive charges to create openings in metallic objects or structures is often useful in various applications such as for disabling explosive ordnance, for industrial applications such as venting, and for enabling entry past barriers, such as for enabling rescues, as well as for other similar applications. There is an unmet need for a dual initiation explosive charge that can be implemented as an inexpensive, easily- and quickly-rendered apparatus; having the capability to breach, fracture, penetrate or cut steel or other metallic targets; having the capability to cut extremely long metallic targets with a single dual initiation apparatus; having the capability to fracture and breach a target with a breach pattern of widely varying geometric, polygonal, or free-form shapes in a metallic target; having the capability of producing generally fragment-free scattering in the surroundings of a target; and having the capability of producing generally no spallation at the back of a target surface.

The configuration of the DISC apparatus invention addresses these needs and provides a number of advantages over previous explosive charge configurations. Rather than specifying initiation at least three equidistant points along the periphery of a sheet explosive such as is characteristic of other explosive charges, the DISC apparatus invention is initiated by a single detonator or initiation source and detonates a strip of explosive charge at two separate contacts. When the explosive charge is initiated at the two contact areas, explosively induced stresses reflect within the target and meet to create a fracture along a generally single fracture contour in the target. This contrasts with other explosive charge devices that create multiple fracture lines in a target when initiated at least three equidistant points. In creating the generally single fracture contour in a target, the DISC apparatus invention produces less spallation than other explosive charge devices configured with similar amounts of high explosive. That is, the explosive charge configuration of the DISC apparatus creates a fracture in the target along a generally single fracture contour, thus creating a breach in a target, and this single fracture contour produces generally fragment-free scattering and less spallation than explosive charge configurations that induce multiple fracture lines within a target.

In addition, the methods for making and implementing a DISC apparatus provide numerous advantages over previous methods for making and implementing explosive charges. The methods for making and implementing a DISC apparatus comprise steps for rapid prototyping; implement efficient steps and designs for metering consistent, repeatable, and controlled amount of high explosive; and utilize readily available materials; and can be implemented quickly in the field.

The methods for making and implementing a DISC apparatus comprise steps for designing, integrating, configuring, and coupling components from sophisticated, yet inexpensive materials and techniques. The two main structural components of the DISC apparatus invention can be created comprising steps for rapid prototyping and can incorporate one or a combination of a wide range of rapid prototyping techniques as fused deposition modeling (FDM), stereolithography (SLA), selective laser sintering (SLS), rapid injection molding, or other similar techniques. Steps for rapid prototyping enable the creation of an intricate, sophisticated, and efficient explosive firing train and dual initiation structure of a DISC apparatus at a fraction of the cost compared to other manufacturing processes. The methods for making and implementing a DISC apparatus comprises steps for the design and creation of efficient metering of explosive configured within the cavities of the components of the dual initiation structure of the DISC, and can be quickly implemented by configuring and coupling the explosive firing train with the dual initiation structure of the DISC.

Similarly, use of time consuming or complicated connectors for coupling the components of the apparatus are eliminated as the methods for making and implementing a DISC apparatus integrate coupling mechanisms that are designed and configured within the dual initiation structure of the DISC. The method for making comprises these or similar steps and enable the DISC apparatus invention to be created as an inexpensive, easily- and quickly-rendered apparatus and can be implemented quickly in the field.

BRIEF DESCRIPTION OF THE DRAWINGS

FIGS. 21A and 21B illustrate a third exemplary configuration of a Dual Initiation Strip Charge apparatus according to an exemplary embodiment of the invention and a breach pattern resulting from a fracture in, and a breach of a target.

The Figures depict various embodiments and configurations of the present invention for purposes of illustration only. Note that the Figures are not necessarily illustrated to scale. One skilled in the art will readily recognize from the following discussion that alternative embodiments and configurations of the invention's apparatus and methods illustrated herein may be employed without departing from the principles of the invention described herein.

DETAILED DESCRIPTION

The Dual Initiation Strip Charge apparatus invention utilizes the collision and reflection of explosively induced stress waves to plastically deform, fracture, and to create a breach in metallic targets. In exemplary embodiments of the DISC apparatus invention, a strip of sheet explosive integrated within the DISC apparatus, is emplaced in close proximity with a metallic target and is interfaced with the target by a target interface means, such as a layer of a hydrogel or a strip of two-sided tape. Dual initiation of the strip of sheet explosive creates shock waves in the target's metallic structure that collide and reflect in a linear manner. The reflected shock waves exceed the tensile strength of the target's structure, and thereby fracture the target along a generally single fracture contour and thus creating a breach in the target. This generally single fracture contour created by the DISC apparatus also produces generally fragment-free scattering and less spallation than explosive charge configurations that induce multiple fracture lines within a target.

Figure 1A:
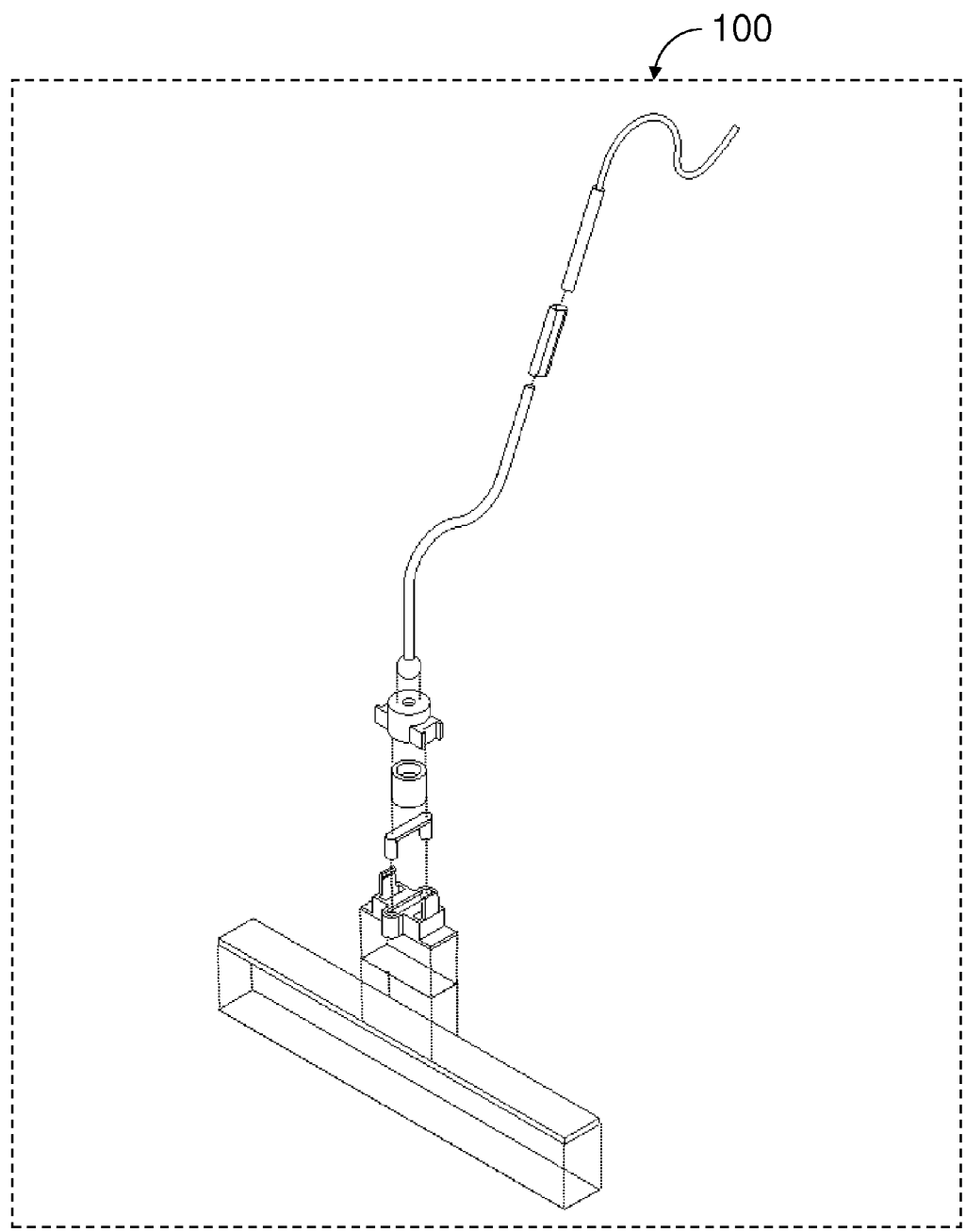
FIGS. 1A and 1B illustrate an exploded isometric view of a Dual Initiation Strip Charge apparatus according to a first exemplary embodiment of the invention.
Figure 1B:
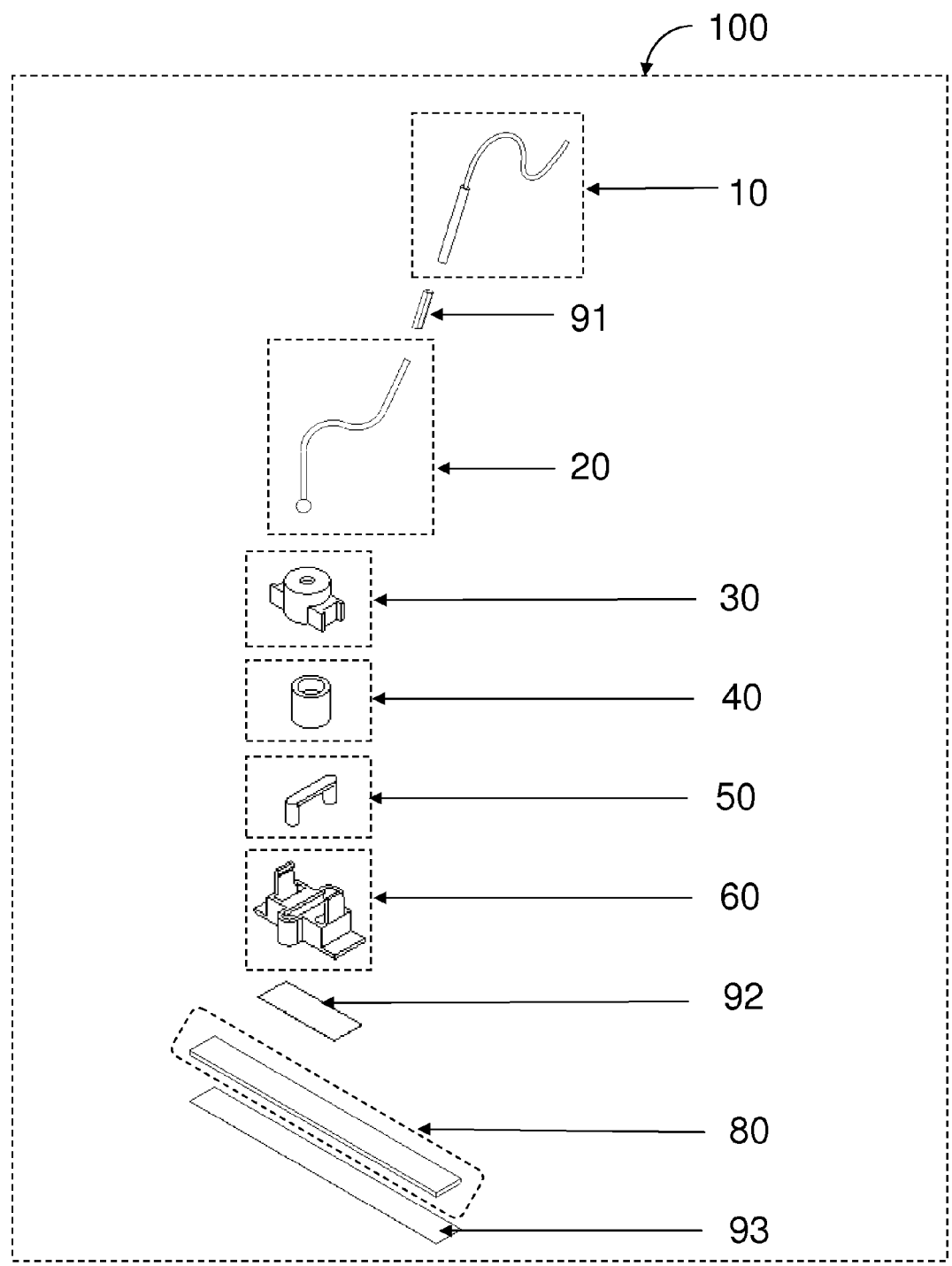

To address certain problems unmet by existing apparatus and methods, various embodiments may comprise the DISC apparatus invention. As illustrated in a first exemplary embodiment of the invention in FIGS. 1A (an unlabeled exploded isometric view) and 1B (an exploded isometric view), the DISC apparatus invention 100 comprises an Initiation Means 10; an Initiation Coupling Means 91; a Detonating Link 20; a Detonating Link Holder 30; a Detonating Pack 40; a Firing Contacts Pack 50; a Firing Contacts Substrate 60; a Strip Coupling Means 92; a Strip of Sheet Explosive 80; and a Target Interface Means 93.

Figures 2A, 2B:
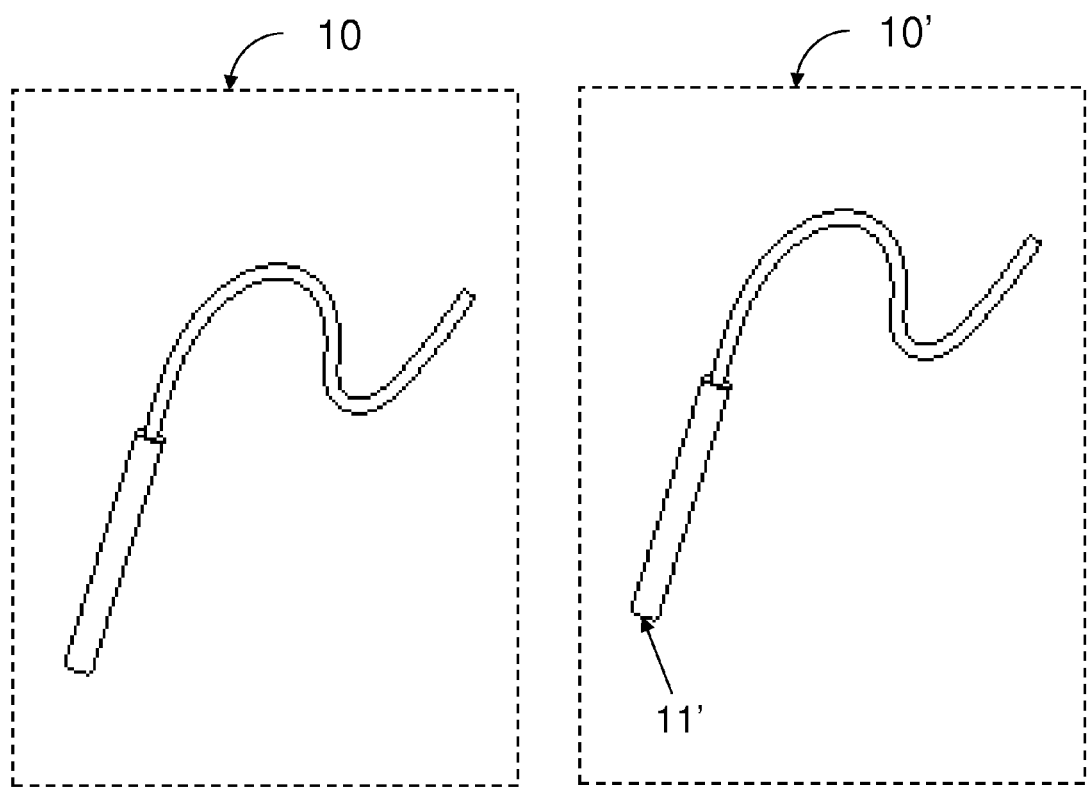
FIGS. 2A and 2B illustrate an Initiation Means according to a first exemplary embodiment of the invention and according to a second exemplary embodiment of the invention, respectively.

An exemplary embodiment of the Initiation Means 10 is illustrated in FIG. 2A, and is shown comprising a detonator and a shock tube. Note, however, the Initiation Means 10 can comprise a wide range of initiation or detonation sources of commercial or military grade with the capability to initiate an explosive firing train and detonate a sheet explosive charge. Initiation means with the capability of initiating generally isochronal firing of firing point contacts via the explosive firing train are preferred. In operation, the Initiation Means 10 communicates detonation through the explosive firing train to the Strip of Sheet Explosive 80, such that the Strip of Sheet Explosive 80 is initiated at two contact areas with a high degree of isochronicity.

Figure 3:
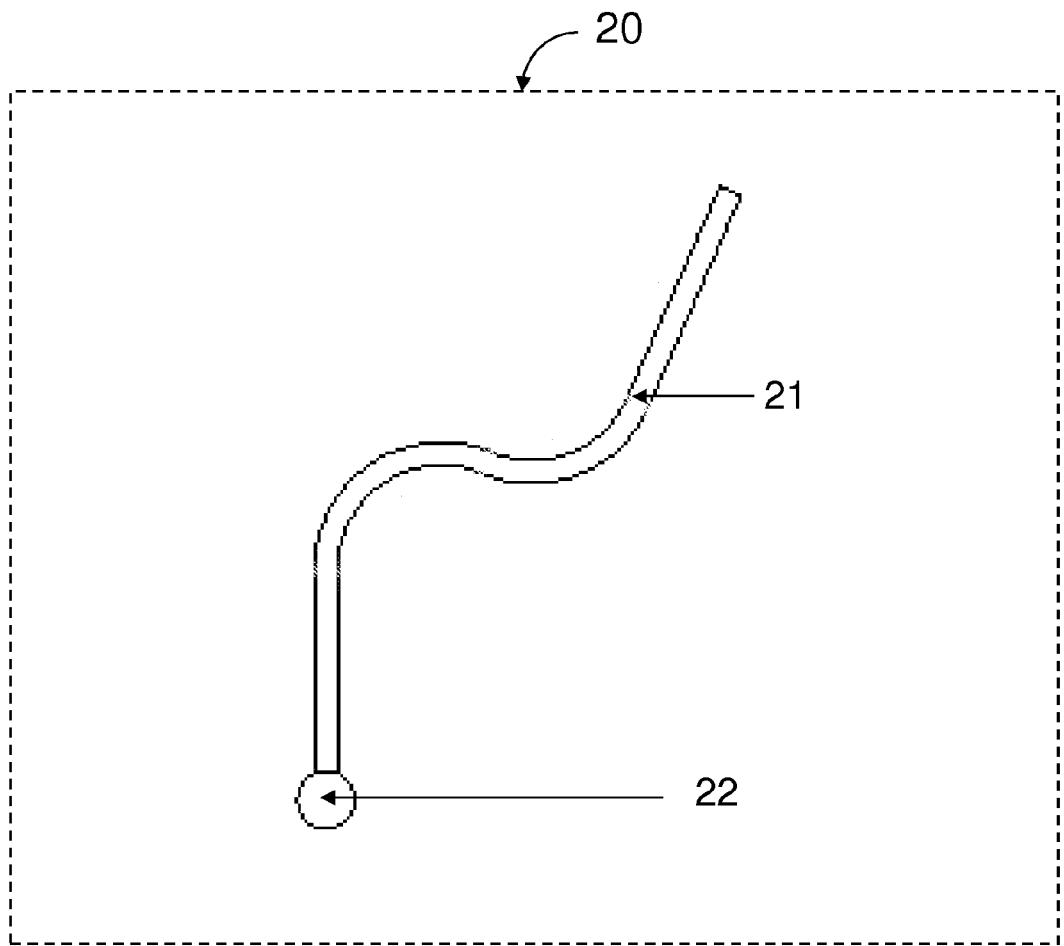
FIG. 3 illustrates a side view of a Detonating Link according to a first exemplary embodiment of the invention.

As shown in an exemplary embodiment in FIG. 3, the Detonating Link 20 comprises a Detonating Link Cord 21 and a Detonating Link Knot 22. The Detonating Link 20 can be constructed from a variety of types of cords useful for detonating explosive charges. A Detonating Link 20 comprising a PETN-based (pentaerythritol tetranitrate) explosive charge with a general core load of 50 grains/foot is generally recommended, however this is not a limitation of the invention, as other explosive charge materials with a core load ranging from five grains/foot to grains/foot can also be used. The Detonating Link 20 length generally ranges six inches to 16 inches however this is not a limitation of the invention. A recommended Detonating Link 20 length for many applications is generally eight inches.

Figure 4A:
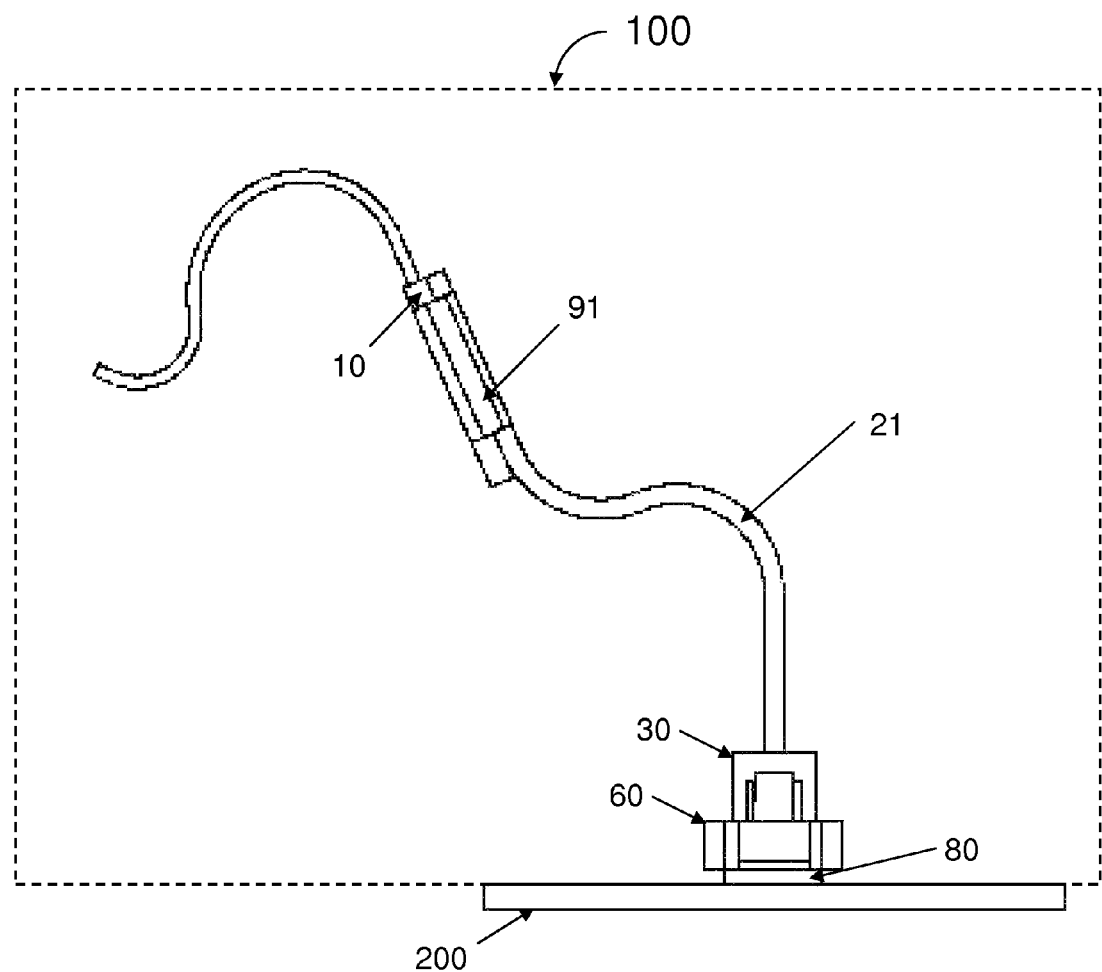
FIG. 4A illustrates a side view of a Dual Initiation Strip Charge apparatus according to a first exemplary embodiment of the invention.
Figure 4B:
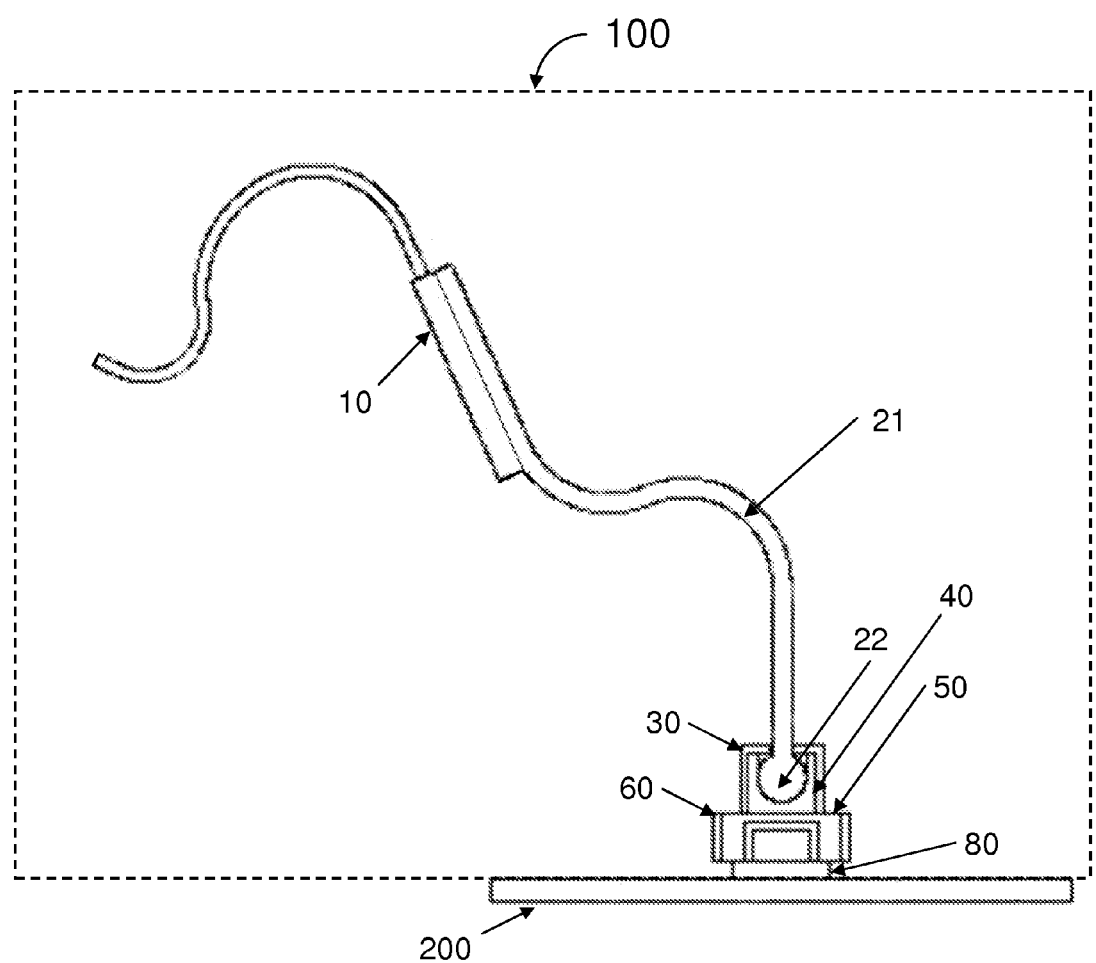
FIGS. 4B and 4C illustrate a side sectional and a side cut-away view of a Dual Initiation Strip Charge apparatus according to a first exemplary embodiment of the invention.

As illustrated in an exemplary embodiment in a side view in FIG. 4A, the Detonating Link Cord 21 is coupled to the Initiation Means 10 via an Initiation Coupling Means 91. The Means for Initiation Coupling 91 comprises a wide range of coupling means types including tape, adhesives, VELCRO

[trade], or similar items that have the capability of securely coupling the Initiation Means 10 with the Detonating Link 20.

Figure 5A:
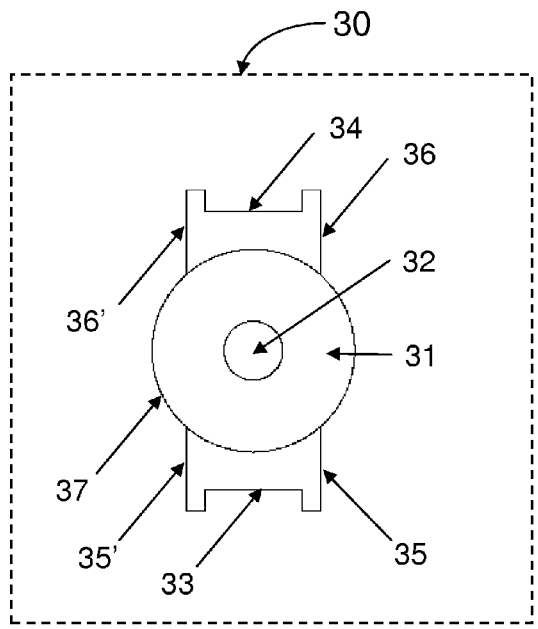
FIGS. 5A, 5B, 5C and 5D illustrate a top view, an isometric view, and views from the sides of a Detonating Link Holder.
Figure 5B:
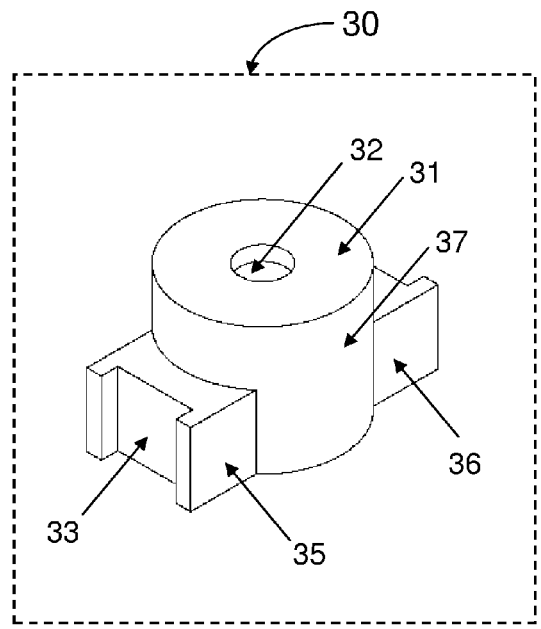
Figure 5C:
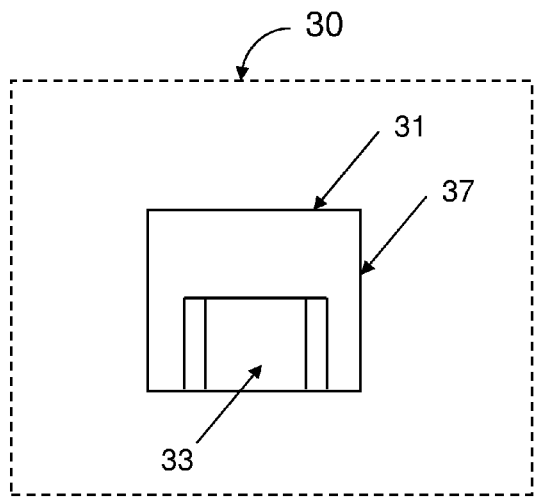
Figure 5D:
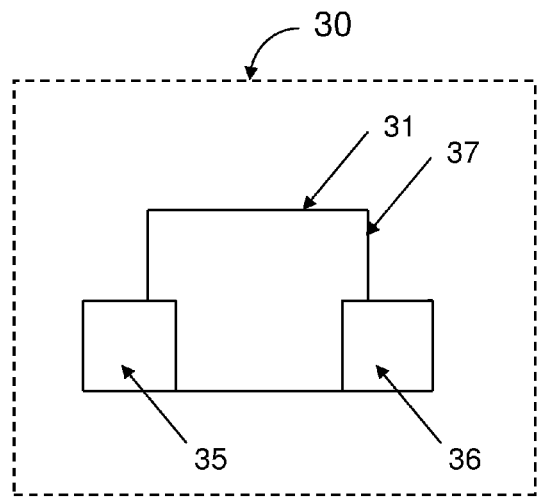

An exemplary embodiment of the Detonating Link Holder 30 is illustrated in FIGS. 5A (view from top), 5B (isometric view), 5C (a view from one of the ends with a groove), 5D (view from one of the sides with flanges), 5E (view from underneath, unpopulated); and 5F (view from underneath, populated with a Detonating Link 20 and a Detonating Pack 40). The Detonating Link Holder 30 comprises a Top Side 31; a Holder Housing 37; a Holder Cavity 39 within the Holder Housing 37; a Hole 32 that is extends from the Top Side 31 through to the Holder Cavity 39; Snap Grooves, 33 and 34; Flanges 35 and 35'; Flanges 36 and 36'; and a Detonating Link Holder Bottom Side 38. The design of the Detonating Link Holder 30 is devised to integrate the sizing of the Hole 32; the sizing of the Holder Cavity 39; and the design of the Snap Grooves, 33 and 34; into a Detonating Link Holder 30 design that can easily implement steps for rapid prototyping in order to make a Detonating Link Holder 30. The Holder Diameter of the Hole 32 is sized to be larger than the Cord Diameter of the Detonating Link Cord 21 and is configured to accommodate the insertion of the Detonating Link Cord 21. The size of the Holder Cavity 39 is configured to accommodate population by the insertion of the Detonating Link Knot 22 within the Holder Cavity 39; as well as to accommodate population by the filling, pressing and tamping of the Detonating Pack 40, thus encapsulating the Detonating Link Knot 22. The Holder Diameter of the Hole 32 is sized to be smaller than the Knot Diameter of the Detonating Link Knot 22.

Figure 4C:
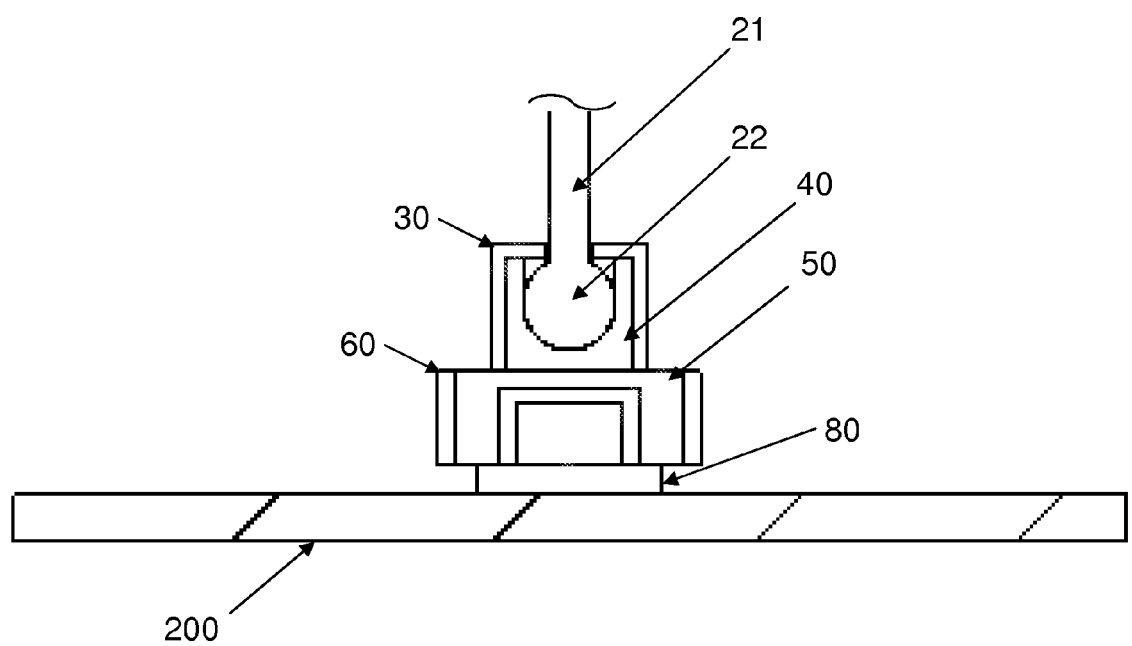
Figure 6A:
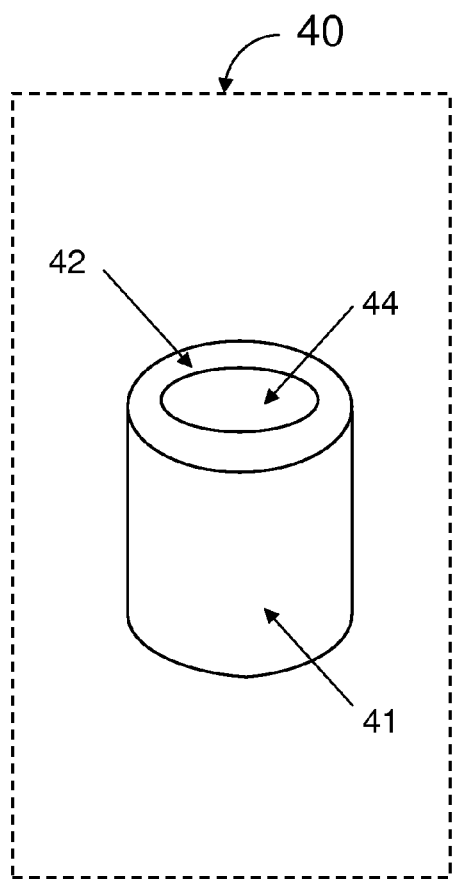
FIGS. 6A and 6B illustrate isometric views of a Detonating Pack according to a first exemplary embodiment of the invention.
Figure 6B:
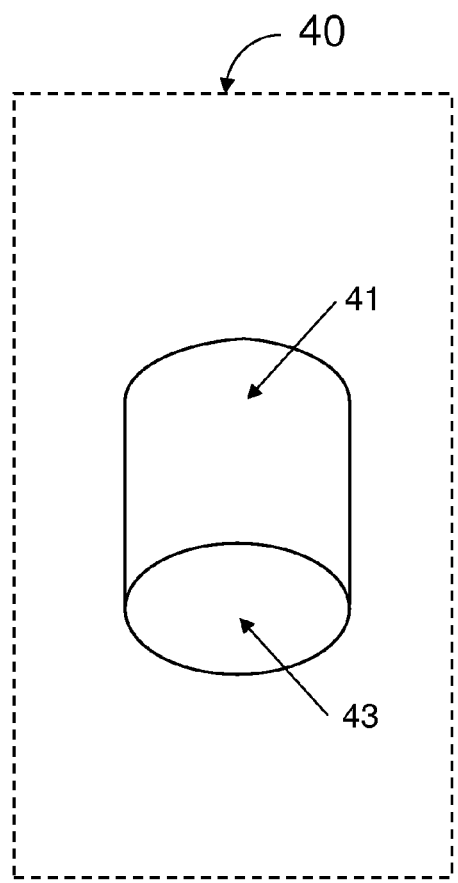

An exemplary embodiment of the Detonating Pack 40 is notionally illustrated in FIGS. 6A and 6B. The Detonating Pack 40 comprises a Detonating Pack Outer Shell 41, a Detonating Pack Inner Shell 44, a Detonating Pack Top Edge 42, and a Detonating Pack Bottom Side 43. The Detonating Pack 40 can be constructed from a variety of high explosive materials possessing a critical diameter of less than or equal to five millimeters, including but not limited to PETN, RDX (cyclotrimethylenetrinitramine), XTX-8003 (extrudable explosive comprising a mixture of microcrystalline PETN and a silicone rubber binder), and Comp C-4 (comprising RDX, silica, and binder), among others. For many applications, a recommended Detonating Pack 40 material is a PETN-based sheet explosive or a RDX-based sheet explosive. As can be seen in the illustration in FIG. 4C, and as identified above, the Detonating Link Cord 21 is inserted through the Hole 32, and the Detonating Link Knot 22 is inserted to populate the Holder Cavity 39 of the Detonating Link Holder 30. The Detonating Pack 40 material is then inserted to fill and to pack any remaining voids within the Holder Cavity 39, thus encapsulating the Detonating Link Knot 22 within the Holder Cavity 39.

Figure 5E:
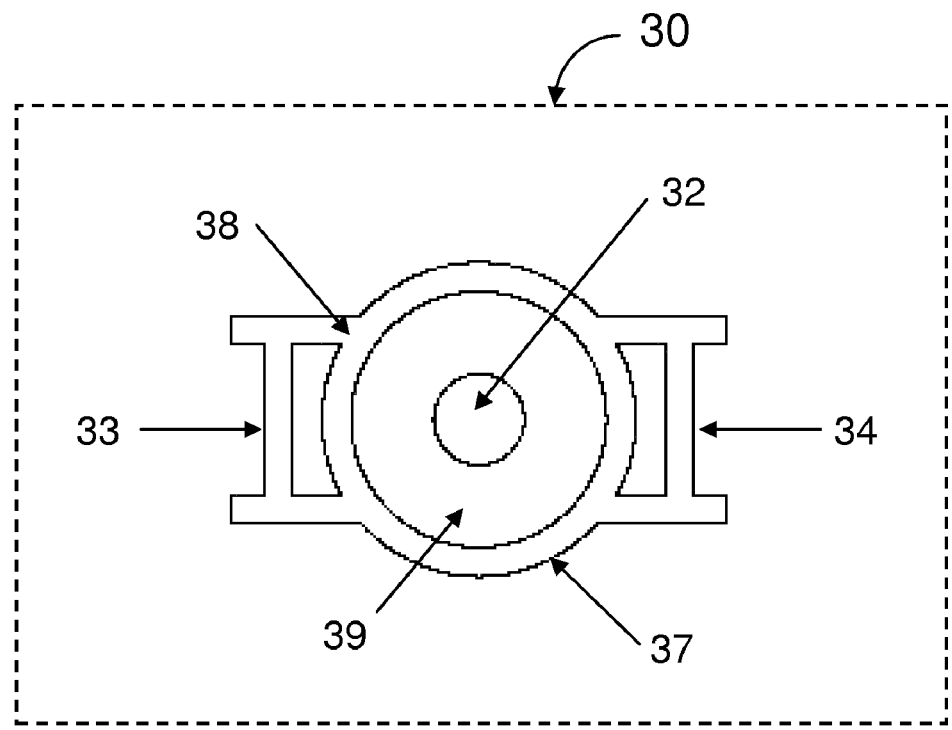
FIGS. 5E and 5F illustrate views from the underneath side of an unpopulated and a populated Detonating Link Holder, respectively, according to a first exemplary embodiment of the invention.
Figure 5F:
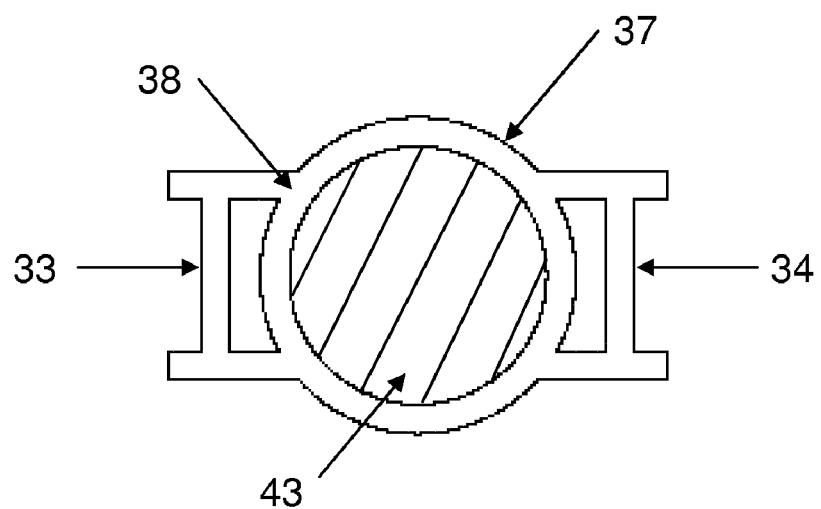

A view of an exemplary embodiment from underneath a pre- or un-populated Detonating Link Holder 30 is illustrated in FIG. 5E. A view of an exemplary embodiment from underneath a populated Detonating Link Holder 30 is illustrated in FIG. 5F (i.e., populated by inserting the Detonating Link Cord 21 through the Hole 32, and, thereby, inserting the Detonating Link Knot 22 and Detonating Pack 40 within the Holder Cavity 39), revealing the Detonating Pack Bottom Side 43.

Figure 7A:
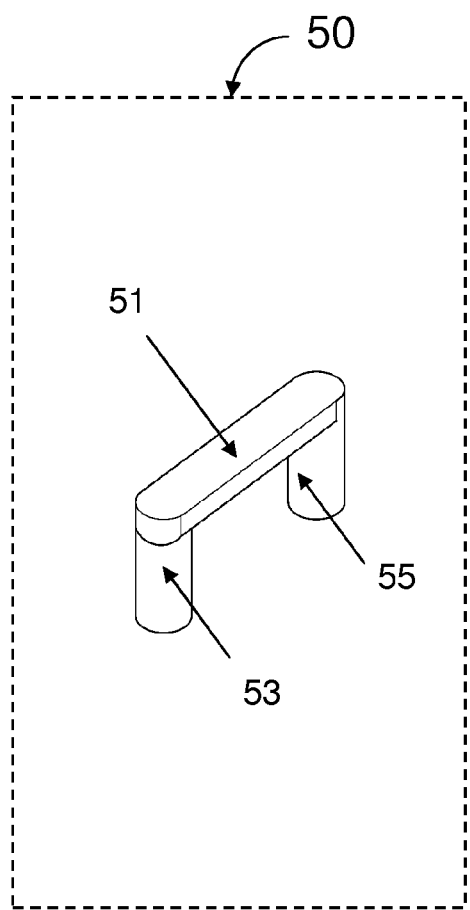
FIGS. 7A and 7B illustrate an isometric view and a view from underneath the Firing Contacts Pack according to a first exemplary embodiment of the invention.
Figure 7B:
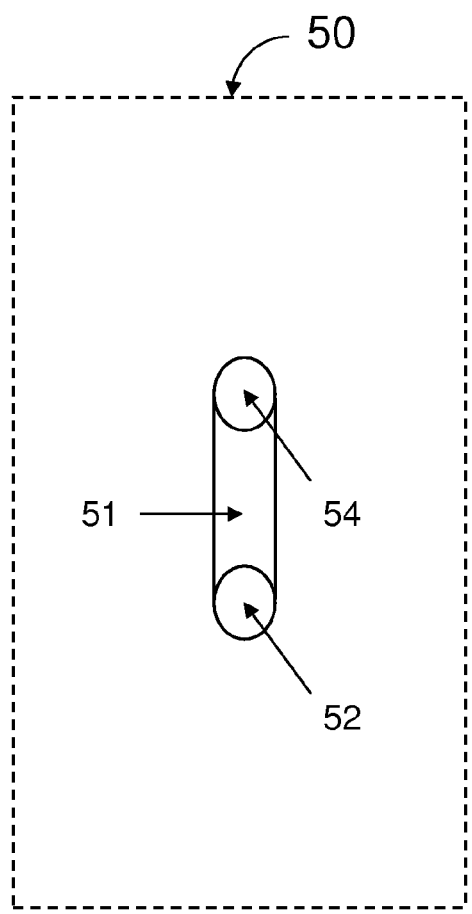

As in exemplary embodiments shown in FIGS. 7A (isometric view) and 7B (view from underneath), the Firing Contacts Pack 50 is illustrated comprising a Firing Contacts Channel Packing 51; a Firing Contact 52; a Firing Contact Packing 53; a Firing Contact 54; and a Firing Contact Packing 55. The Firing Contacts Pack 50 can be constructed from a variety of high explosive materials possessing a critical diameter of less than or equal to five millimeters, including but no limited to PETN, RDX, XTX-8003, and Comp C-4, among others. For many applications, a recommended Firing Contacts Pack 50 material is a PETN-based sheet explosive or a RDX-based sheet explosive. The Firing Contacts Pack 50 is prepared and configured by filling, pressing, and tamping the Firing Contacts Pack 50 material into specific cavities of the Firing Contacts Substrate 60, as described in the METHODS SECTION below. The Firing Contacts Pack 50 is designed to facilitate communication of detonation along the explosive firing train between the Initiation Means 10 and the Strip of Sheet Explosive 80. In particular, the Firing Contacts Pack 50 is designed and configured as a metered amount of high explosive that supports efficient detonation communication between the Initiation Means 10, the Detonating Link 20, the Detonating Pack 40, the Firing Contacts Pack 50, and the Strip of Sheet Explosive 80.

Figure 8A:
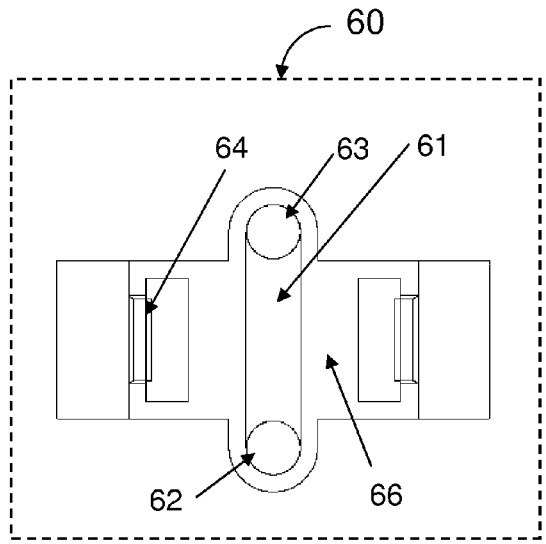
FIGS. 8A, 8B, 8C and 8D illustrate a top view, an isometric view, a side view, and a bottom view of the Firing Contacts Substrate according to a first exemplary embodiment of the invention.
Figure 8B:
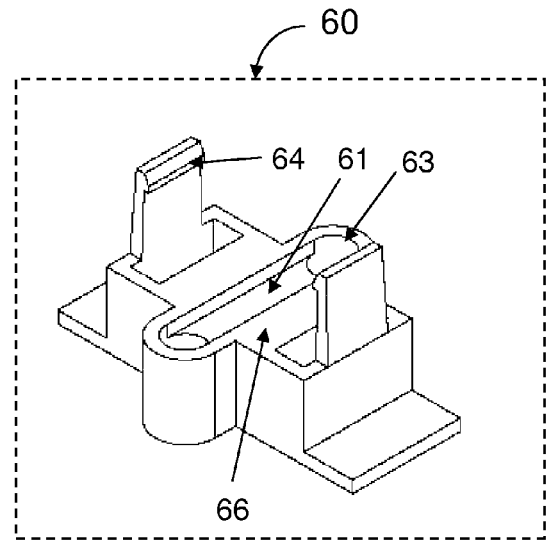
Figure 8C:
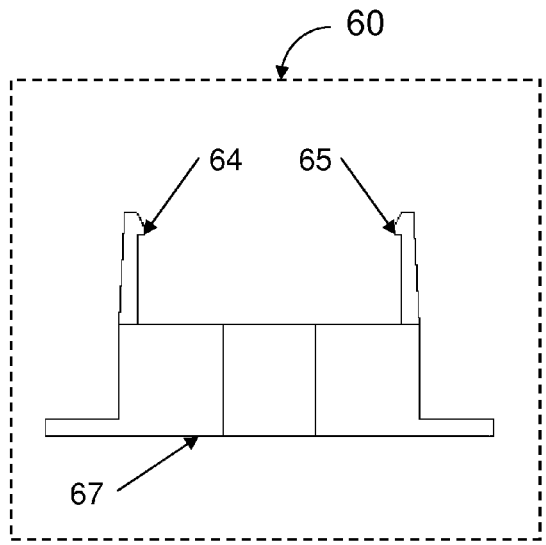

As shown in an exemplary embodiment in FIGS. 8A (top view), 8B (isometric view), 8C (side length view) and 8D (bottom view), the Firing Contacts Substrate 60 comprises a Firing Contacts Channel 61; two Firing Contact Wells, 62 and 63; two Firing Contact Well Centers, 68 and 69, associated with the Wells, 62 and 63; Snap Hooks, 64 and 65; a Substrate Top Side 66; and a Substrate Bottom Side 67. The design of the Firing Contacts Substrate 60 is devised to integrate the Firing Contact Wells, 62 and 63; the distance between the Firing Contact Well Centers, 68 and 69; the Firing Contacts Channel 61; the design of the Snap Hooks, 64 and 65; and the size of the Substrate 60; into a Firing Contacts Substrate 60 design that can easily implement steps for rapid prototyping in order to make a Firing Contacts Substrate 60. In addition, the Firing Contacts Channel 61 and the two Firing Contact Wells, 62 and 63, of the Firing Contacts Substrate 60 design form a portion of an efficient firing train cavity that accepts the Firing Contacts Pack 50 as a metered amount of high explosive. The firing train cavity is configured and integrated as a portion of the dual initiation structure that supports the configuration of the explosive firing train between the Initiation Means 10 and the Strip of Sheet Explosive 80.

Figure 8D:
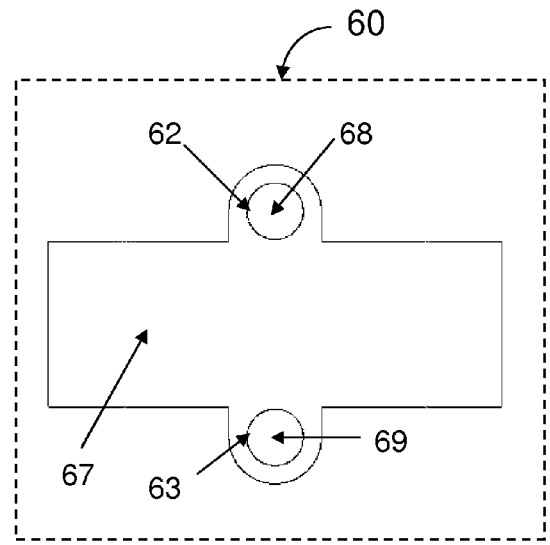

The Firing Contact Well Centers, 68 and 69, are each generally located at the center of the respective apertures of the Firing Contact Wells, 62 and 63. The apertures of the Firing Contact Wells, 62 and 63, are illustrated as circular-shaped in FIGS. 8A-8E, however, this is not a limitation of the present invention, as the apertures of the Firing Contact Wells, 62 and 63, can be constructed in a wide range of geometric, polygonal and free-form shapes including circular-, elliptic-, square-, or rectangular-shaped, or any combination thereof. For all apertures of the Firing Contact Wells, 62 and 63, the larger dimension of the aperture (e.g., the larger dimension is defined as the diameter of a circular-shaped aperture, or as the major axis of an elliptic-shaped aperture, or as the length of a rectangular- or a square-shaped aperture, etc.) should be configured as generally parallel with the edge of the Strip of Sheet Explosive 80. As shown in FIG. 8D, the width dimension of the Substrate Bottom Side 67 and is determined and configured to be generally equal to the distance between the Firing Contact Well Centers, 68 and 69, less the smaller dimension of the aperture of the Firing Contact Wells, 62 and 63 (e.g., the smaller dimension is defined as the diameter of a circular-shaped aperture, or as the minor axis of an elliptic-shaped aperture, or as the width of a rectangular-shaped aperture, or as the length of a square-shaped aperture).

As described in the METHODS SECTION below, the Firing Contacts Pack 50 is prepared and configured by filling, pressing, and tamping specific cavities of the Firing Contacts Substrate 60 with Firing Contacts Pack 50 material. From the top side of the Firing Contacts Substrate 60, the Firing Contact Wells, 62 and 63 are filled, pressed and tamped with Firing Contacts Pack 50 material. The impressed Pack 50 material configures the Firing Contact 52, the Firing Contact Packing 53, the Firing Contact 54, and the Firing Contact Packing 55. Similarly, the Firing Contacts Channel 61 is filled, pressed and tamped with Firing Contacts Pack 50 material, and the impressed material configures the Firing Contacts Channel Packing 51.

The Strip Coupling Means 92 is disposed between the Firing Contacts Substrate 60 and the Strip of Sheet Explosive 80, and is applied to cover the area of the Substrate Bottom Side 67 of the Firing Contacts Substrate 60, with the exception, however, ensuring that the Firing Contacts, 52 and 54, remain uncovered. The Strip Coupling Means 92 comprises any type of suitable coupling material or mechanism or any combination thereof that has the capability to quickly couple and bring into close proximity the Firing Contacts Substrate 60 with the Strip of Sheet Explosive 80, such as two-sided tape, adhesives, VELCRO [trade] or similar items. The Means for Strip Coupling generally comprises a strip of two-sided tape.

The dual initiation structure of the present invention comprises the Detonating Link Holder 30 and the Firing Contacts Substrate 60, and is prepared by coupling the populated Detonating Link Holder 30 with the populated Firing Contacts Substrate 60. The Snap Hooks, 64 and 65, of the Firing Contacts Substrate 60 are designed to operatively couple with the Snap Grooves, 33 and 34, of the Detonating Link Holder 30 as the Substrate 60 and the Holder 30 are coupled together. The design of the Snap Hooks, 64 and 65, and the Snap Grooves, 33 and 34, coordinate quick and easy coupling of the Firing Contacts Substrate 60 with the Detonating Link Holder 30 eliminating the need for adhesives or other more complicated fasteners for coupling. As the Substrate 60 and the Holder 30 are coupled together, the Detonating Link Holder 30 is pressed towards the Firing Contacts Substrate 60 until the Detonating Link Holder Bottom Side 38 is seated against the Substrate Top Side 66. The coupling of the Detonating Link Holder 30 with the Firing Contacts Substrate 60 ensures a sufficiently rigid dual initiation structure for the DISC apparatus.

As illustrated in exemplary embodiments in FIGS. 1A, 1B, 4A, 4B, and 4C, the Strip of Sheet Explosive 80 is integrated within the DISC 100 apparatus and located under the Firing Contacts Substrate 60 and the Strip Coupling Means 92. As shown in exemplary embodiments in FIGS. 9A and 9B, the Strip of Sheet Explosive 80 comprises a Strip Explosive Top 81; a Strip Explosive Bottom 82; Strip Explosive Ends, 83 and 84; and Strip Explosive Edges, 85 and 86.

The Strip of Sheet Explosive 80 is coupled to the dual initiation structure of the DISC by disposing the Strip Coupling Means 92 to the Strip Explosive Top 81 of the Strip of Sheet Explosive 80 and to the Substrate Bottom Side 67 of the Firing Contacts Substrate 60. As shown in an exemplary embodiment for coupling the Substrate 60 with the Strip 80 in FIG. 22, a portion of the surface area (e.g., generally half the surface area) of each of the Firing Contacts, 52 and 54, are aligned to abut the Strip Explosive Top 81 of the Strip of Sheet Explosive 80, while the remaining surface area of each of the Firing Contacts, 52 and 54, are exposed and extend beyond the Strip Explosive Edges, 85 and 86, and do not abut the Strip Explosive Top 81. By ensuring that a portion of the surface area of each of the Firing Contacts, 52 and 54, extends beyond the Strip Explosive Edges, 85 and 86, and do not abut the Strip Explosive Top 81, the Strip of Sheet Explosive 80 will detonate completely once the DISC 100 apparatus is initiated.

Figure 9A:
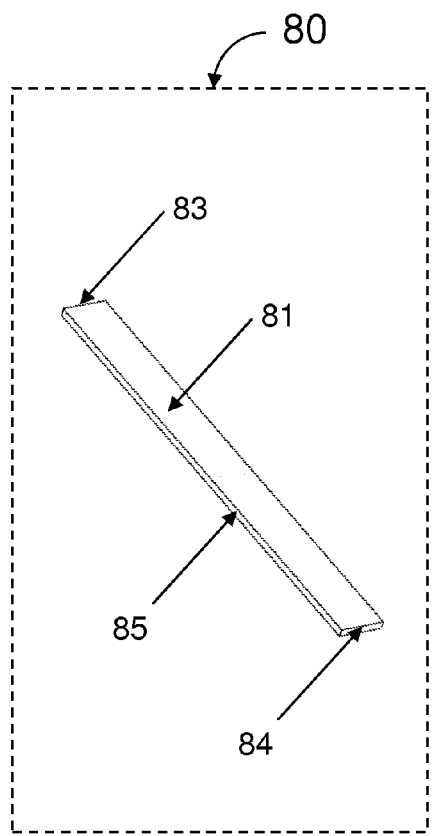
FIGS. 9A and 9B illustrate isometric views of exemplary configurations of a Strip of Sheet Explosive according to a first exemplary embodiment of the invention.
Figure 9B:
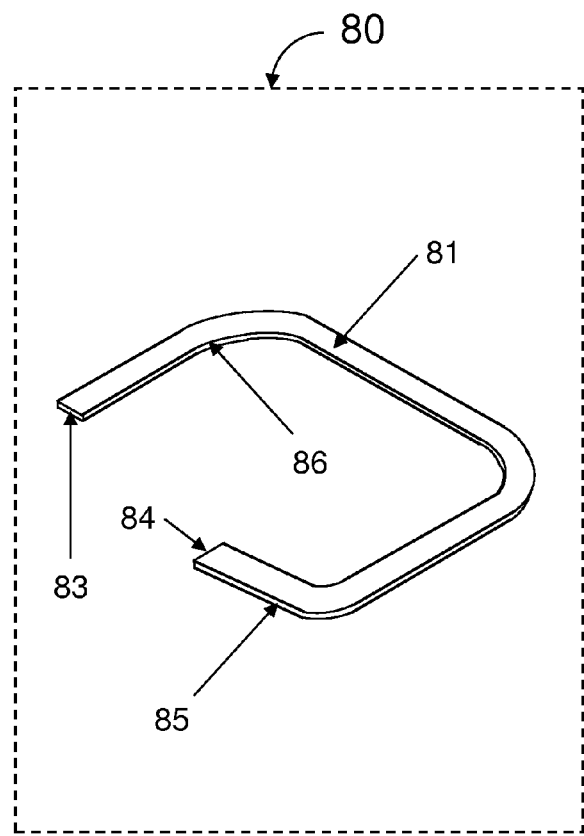

The illustration in FIG. 9A shows the Strip of Sheet Explosive 80 configured as a straight strip, however, the Strip 80 is not limited to straight strip configuration. As long as the Strip Explosive Ends, 83 and 84, do not touch, the Strip 80 can be configured in a wide variety of orientations such as a straight strip, or as curved strip, or as combination straight and curved strip (as shown in an exemplary configuration in FIG. 9B). The detonation of the Strip of Sheet Explosive 80 creates a fracture in the target according to the configuration of the Strip 80 emplaced on the target, and thereby creates a breach in the target along a generally single fracture contour with a breach pattern that is generally a geometric, a polygonal, or a free-form shape. The Strip of Sheet Explosive 80 can be constructed from a variety of materials, including PETN-based, or RDX-based, or similar explosive charges, and generally comprises a PETN-based sheet explosive. It should be noted that although sheet explosive is generally preferred for the Strip of Sheet Explosive 80, this is not a limitation of the present invention. The explosive charge of the Strip of Sheet Explosive 80 can also be comprised of a block of trinitrotoluene, or of a bar of Composition C-4 explosive, or other similar explosive charge.

In order to interface the DISC 100 apparatus with a target, a Target Interface Means 93 is disposed between the Strip Explosive Bottom 82 and a Target 200. The Target Interface Means 93 comprises any type of suitable interfacing material or mechanism or combination thereof, including hydrogels, adhesives, two-sided tape, or similar item, that enables the DISC 100 to be emplaced in close proximity to the surface of the Target 200, and that is as thin as possible so that it does not attenuate the shock wave of the explosive into the target structure. For many applications, the Target Interface Means 93 generally comprises a strip of two-sided tape.

Figure 10:
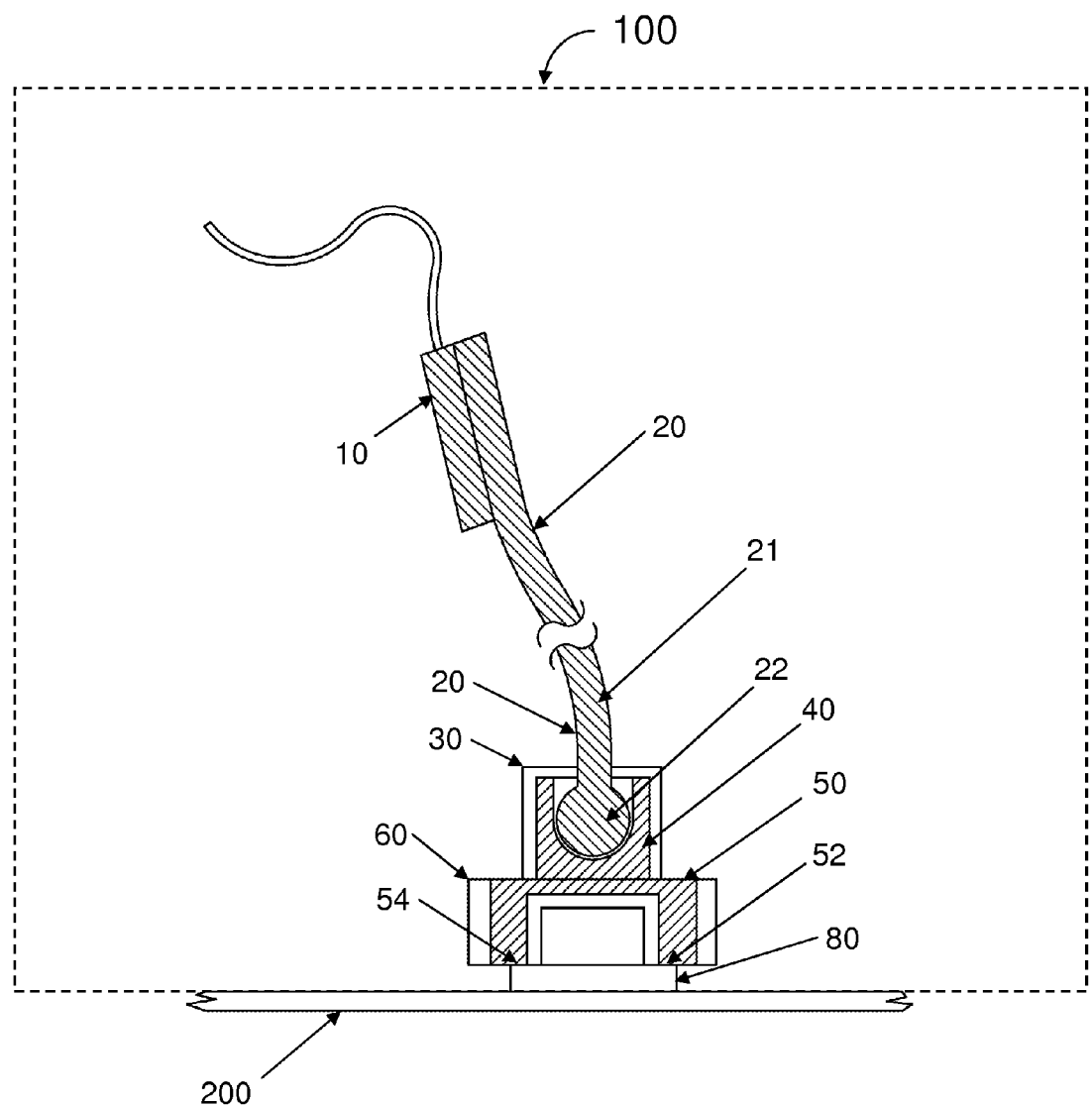
FIG. 10 illustrates a cut-away view from the side of an exemplary embodiment of the invention and showing an efficient explosive firing train marked with gray hatching.

As illustrated in FIG. 10 and as described above, the DISC 100 comprises an efficient explosive firing train that communicates detonation from a single Initiation Means 10 to two separate Firing Contacts, 52 and 54, a portion of which, abut the Strip of Sheet Explosive 80. As identified above, by ensuring that a portion of the surface area for each of the Firing Contacts, 52 and 54, extends beyond the Strip Explosive Edges, 85 and 86, and do not abut the Strip Explosive Top 81, the Strip of Sheet Explosive 80 will detonate completely once the present invention is initiated. The explosive firing train is prepared and comprises the Initiation Means 10, the Detonating Link 20, the Detonating Pack 40, the Firing Contacts Pack 50, and the Firing Contacts, 52 and 54. The components configuring the explosive firing train of the DISC apparatus are shown as marked with gray hatching in FIG. 10. The explosive firing train is configured and coupled with the dual initiation structure of the DISC. The coupled dual initiation structure and explosive firing train enables communication of detonation from a single initiation source to two separate contacts on a strip of sheet explosive. In operation, the Initiation Means 10 communicates detonation through the explosive firing train and to the Strip of Sheet Explosive 80, such that the Strip of Sheet Explosive 80 is initiated at the Firing Contacts, 52 and 54, with a high degree of isochronicity.

Figure 11:
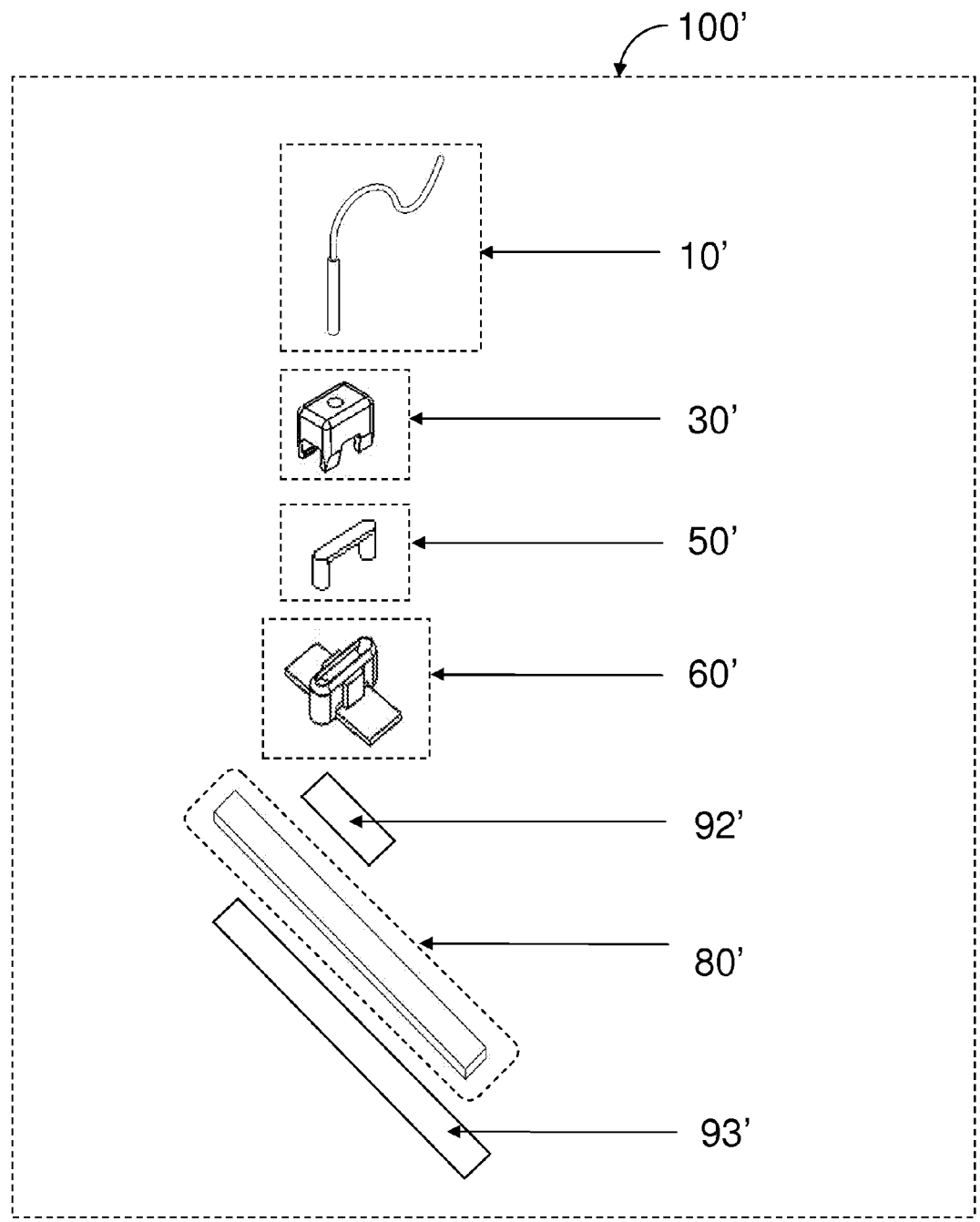
FIG. 11 illustrates an exploded isometric view of a Dual Initiation Strip Charge apparatus according to a second exemplary embodiment of the invention.

As illustrated in a second exemplary embodiment of the invention in FIG. 11 (an exploded isometric view), the DISC 100' apparatus comprises an Initiation Means 10'; an Initiation Holder 30'; a Firing Contacts Pack 50'; a Firing Contacts Substrate 60'; a Strip Coupling Means 92'; a Strip of Sheet Explosive 80'; and a Target Interface Means 93'.

An exemplary embodiment of the Initiation Means 10' is illustrated in FIGS. 2B and 11. In this example, an Initiation Means 10' is shown comprising a detonator and a shock tube, and a Bottom Surface 11' of the Means for Initiation. Note, however, the Initiation Means 10' can comprise a wide range of initiation or detonation sources of commercial or military grade with capability to initiate an explosive firing train and detonate a strip of explosive charge. Means for Initiation with the capability of initiating generally isochronal firing through the explosive firing train are preferred. In operation, the Initiation Means 10' communicates detonation through the explosive firing train and to the Strip of Sheet Explosive 80', such that the Strip of Sheet Explosive 80' is initiated at two contacts with a high degree of isochronicity.

Figure 12:
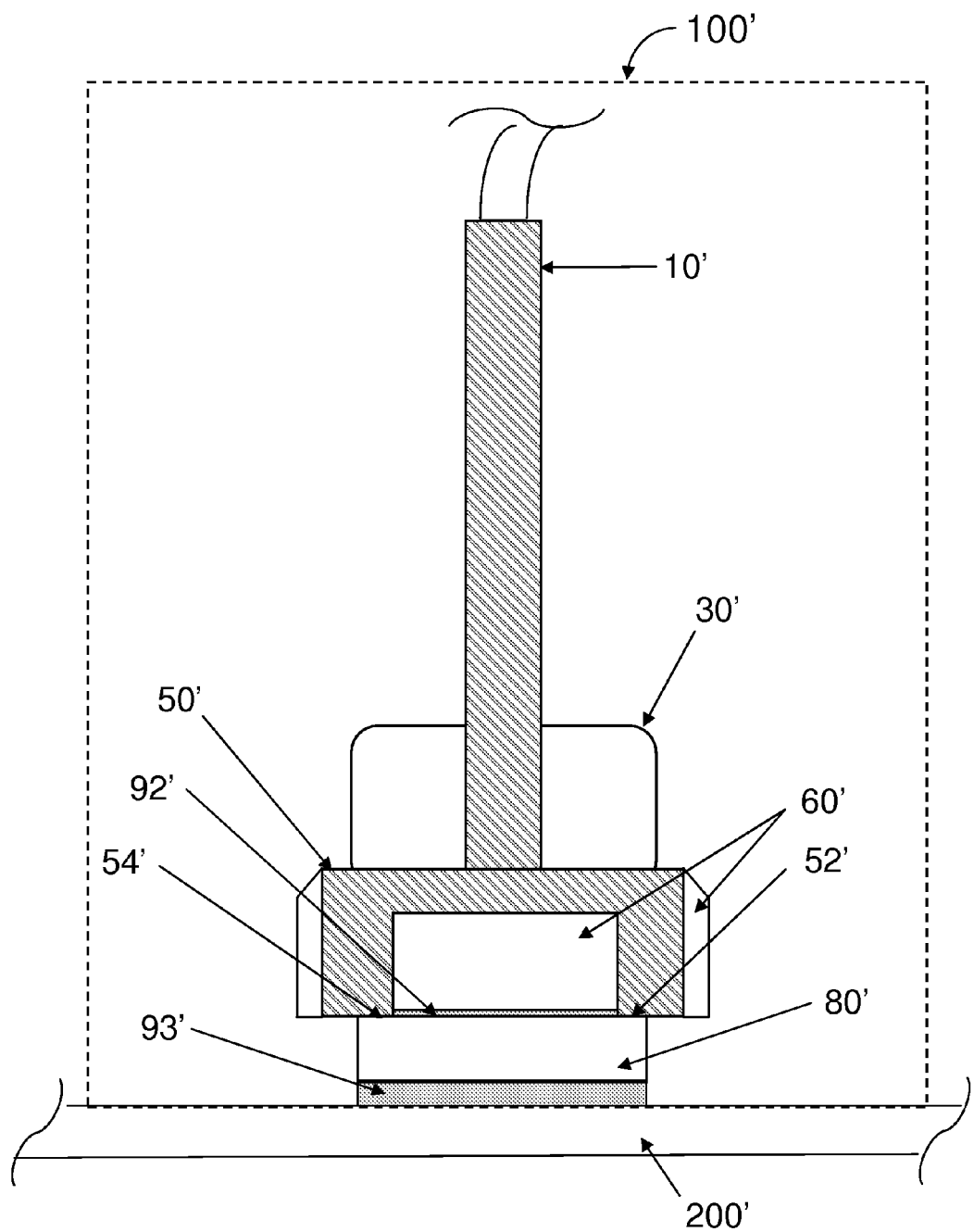
FIG. 12 illustrates a cut-away view of a Dual Initiation Strip Charge apparatus, according to a second exemplary embodiment of the invention.
Figure 13A:
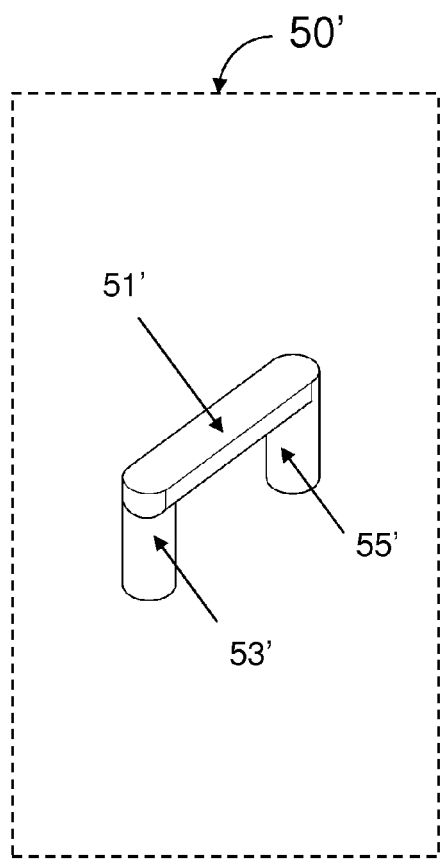
FIGS. 13A and 13B illustrate an isometric view and a view from underneath the Firing Contacts Pack according to a second exemplary embodiment of the invention.
Figure 13B:
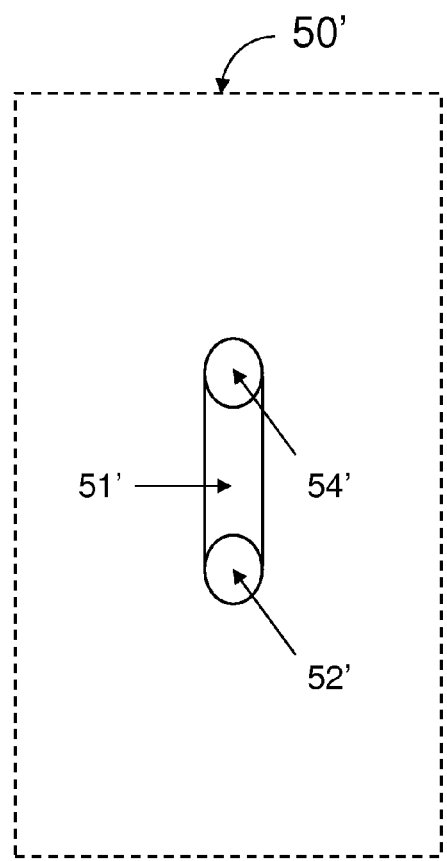

As illustrated in exemplary embodiments in FIGS. 12, 13A and 13B, the Firing Contacts Pack 50' comprises a Firing Contacts Channel Packing 51'; a Firing Contact 52'; a Firing Contact Packing 53'; a Firing Contact 54'; and a Firing Contact Packing 55'. The Firing Contacts Pack 50' can be constructed from a variety of high explosive materials possessing a critical diameter of less than or equal to five millimeters, including but no limited to PETN, RDX, XTX-8003, and Comp C-4, among others. For many applications, a recommended Firing Contacts Pack 50' material is a PETN-based sheet explosive or a RDX-based sheet explosive. The Firing Contacts Pack 50' is designed as a metered amount of high explosive that is integrated with the explosive firing train that communicates detonation to the Strip of Sheet Explosive 80'. The Firing Contacts Pack 50' is prepared and configured by filling specific cavities of the Firing Contacts Substrate 60' with sheet explosive, as described in the METHODS SECTION below.

Figures 14A, 14B:
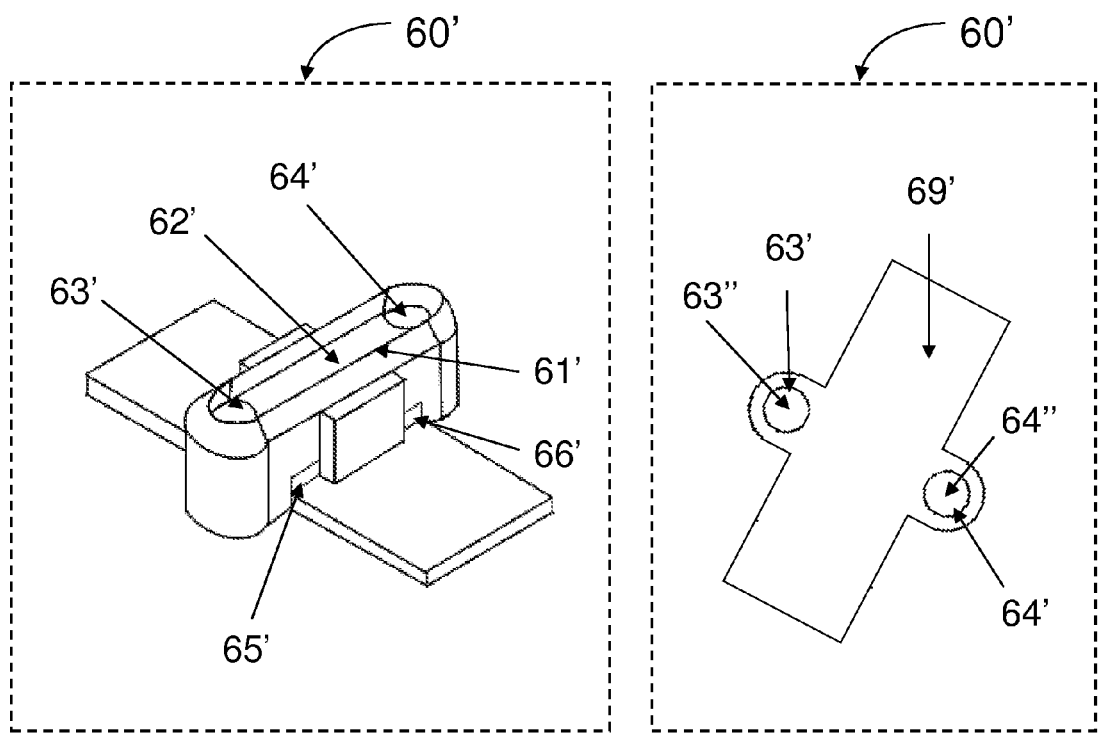
FIGS. 14A and 14B illustrate an isometric view and a bottom view of the Firing Contacts Substrate according to a second exemplary embodiment of the invention.

As illustrated in an exemplary embodiment in FIGS. 14A and 14B, the Firing Contacts Substrate 60' comprises two Firing Contact Wells, 63' and 64'; Firing Contact Well Centers, 63" and 64"; a Firing Contacts Channel 62'; a Knife Edge 61'; four Snap Grooves, 65', 66', 67' and 68'; and a Bottom Side 69'. The design of the Firing Contacts Substrate 60' is devised to integrate the Firing Contact Wells, 63' and 64'; the Firing Contacts Channel 62'; the design of the Snap Grooves, 65', 66', 67' and 68'; and the size of the Substrate 60'; into a Firing Contacts Substrate 60' design that can easily implement steps for rapid prototyping in order to make a Firing Contacts Substrate 60'. In addition, the Firing Contacts Channel 62' and the two Firing Contact Wells, 63' and 64', of the Firing Contacts Substrate 60' design form a portion of an efficient firing train cavity that is designed to accept the Firing Contacts Pack 50' as a metered amount of high explosive. The firing train cavity is configured and integrated as a portion of a dual initiation structure that supports the configuration of the explosive firing train between the Initiation Means 10' and the Strip of Sheet Explosive 80'.

The Firing Contact Well Centers, 63" and 64", are each generally located at the center of the respective apertures of the Firing Contact Wells, 63' and 64'. The apertures of the Firing Contact Wells, 63' and 64', are illustrated as circular-shaped in FIGS. 14A and 14B, however, this is not a limitation of the present invention, as the apertures of the Firing Contact Wells, 63' and 64', can be constructed in a wide range of geometric, polygonal and free-form shapes including circular-, elliptic-, square-, or rectangular-shaped, or any combination thereof. For all apertures of the Firing Contact Wells, 63' and 64', the larger dimension of the aperture (e.g., the larger dimension as defined previously) should be configured as generally parallel with the edge of the Strip of Sheet Explosive 80'. As shown in FIG. 15B, the width dimension of the Substrate Bottom Side 69' is determined and configured to be generally equal to the distance between the Firing Contact Well Centers, 63" and 64", less the smaller dimension (e.g., the smaller dimension as defined previously) of the aperture of the Firing Contact Wells, 63' and 64'.

As described in the METHODS SECTION below, the Firing Contacts Pack 50' is prepared and configured by filling, pressing and tamping specific cavities of the Firing Contacts Substrate 60' with Firing Contacts Pack 50' material. The Firing Contact Wells, 63' and 64', are filled with Firing Contacts Pack 50' material, and the material is filled, pressed and tamped to configure the Firing Contact 52', the Firing Contact Packing 53', the Firing Contact 54', and the Firing Contact Packing 55'. Similarly, the Firing Contacts Channel 61' is filled, pressed and tamped with Firing Contacts Pack 50' material to configure the Firing Contacts Channel Packing 51'.

The Strip Coupling Means 92' is disposed between the Firing Contacts Substrate 60' and the Strip of Sheet Explosive 80', and is coupled to the Bottom Side 69' of the Firing Contacts Substrate 60' and to the Strip Explosive Top 81' of the Strip of Sheet Explosive 80'. The Means for Strip Coupling comprises a wide variety of coupling materials or mechanism or any combination thereof that has the capability to quickly couple and bring into close proximity the Firing Contacts Substrate 60' with the Strip of Sheet Explosive 80', such as two-sided tape, adhesive, VELCRO [trade], or similar items. The Strip Coupling Means 92' generally comprises a strip of two-sided tape.

Figure 15A:
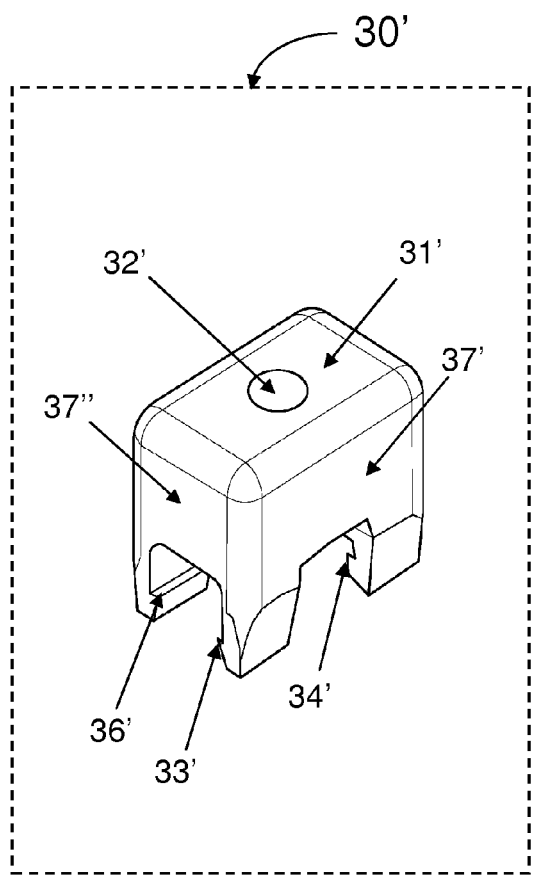
FIGS. 15A, 15B, and 15C illustrate an isometric view, a view from the underneath side of an unpopulated Detonator Holder, and a view from the underneath side of a populated Detonator Holder according to a second exemplary embodiment of the invention.
Figure 15B:
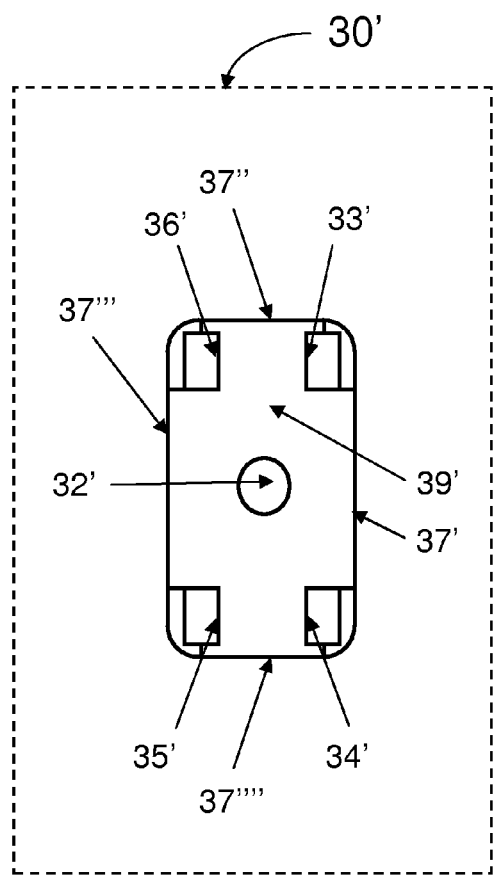
Figure 15C:
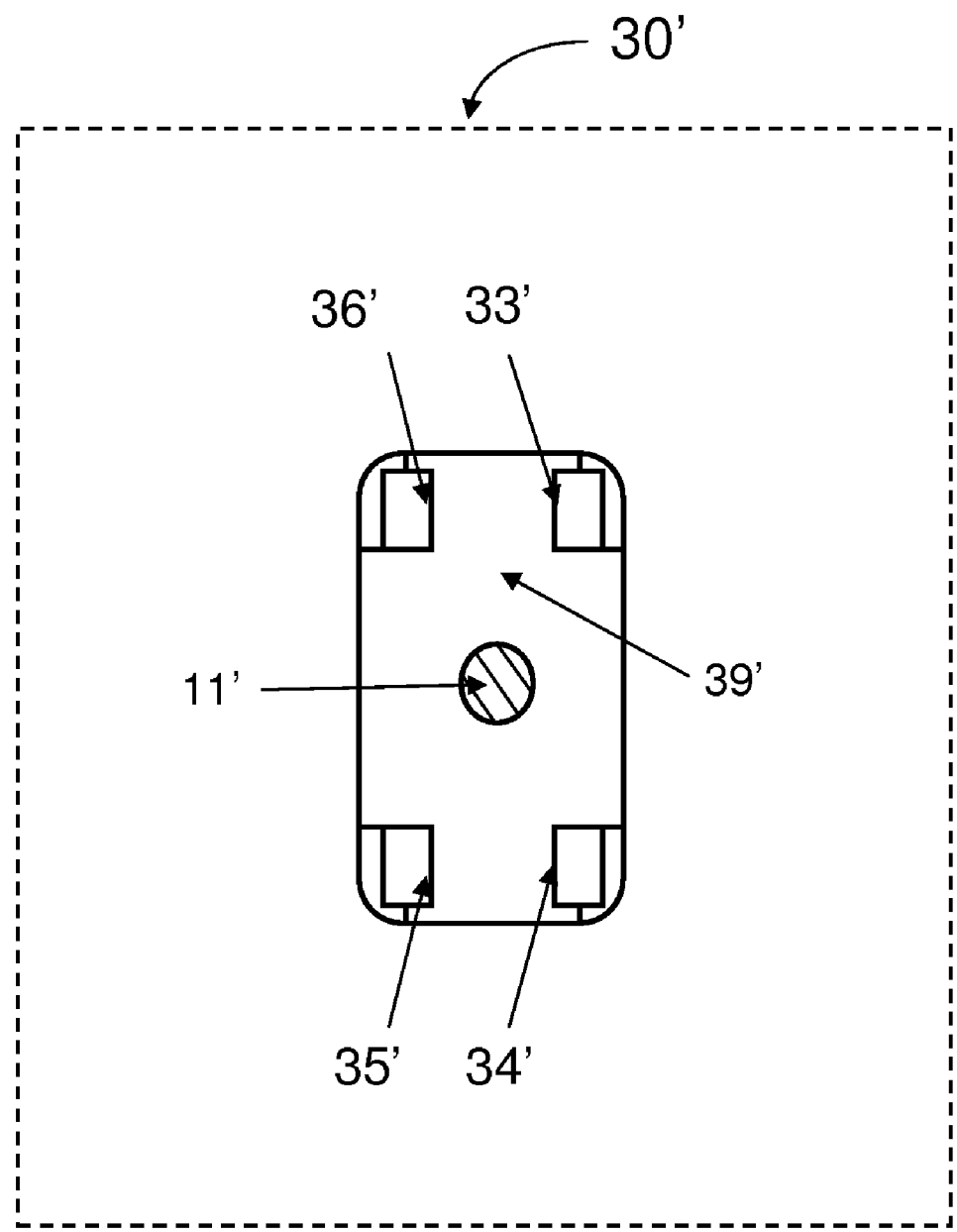

As illustrated in an exemplary embodiment in FIGS. 15A, 15B, and 15C, the Initiation Holder 30' comprises Snap Hooks, 33', 34', 35' and 36'; a Top Side 31'; a Bottom Side 39'; a Holder Housing 37', 37", 37'", and 37""; and a Hole 32' that extends from the Top Side 31' through to the Bottom Side 39' of the Initiation Holder 30'. The Hole 32' is configured to accommodate the insertion of, and thereby the population by the Initiation Means 10'. A view from underneath an unpopulated Initiation Holder 30' is shown in FIG. 15B with Snap Hooks 33'-36'; Bottom Side 39'; and Hole 32'. An underneath view of an exemplary embodiment of the Initiation Holder 30' populated with Initiation Means 10' is shown in FIG. 15C after the Initiation Means 10' has been inserted into the Hole 32'. The Bottom Surface 11' of the Initiation Means 10' is revealed from this underneath view.

The Snap Hooks 33'-36' of the Initiation Holder 30' are designed to operatively couple with the Snap Grooves 65'-68' of the Firing Contacts Substrate 60' as the Initiation Holder 30' and the Firing Contacts Substrate 60' are coupled together. The design of the Snap Hooks 33'-36' and the Snap Grooves 65'-68' accommodate quick and easy coupling of the Initiation Holder 30' with the Firing Contacts Substrate 60' eliminating the need for adhesives or other more complicated fasteners for coupling. In addition, the dual initiation structure of the DISC 100' apparatus is prepared by seating the Initiation Holder 30' against the Firing Contacts Substrate 60' and by coupling the Snap Hooks 33'-36' with the Snap Grooves 65'-68' as the Initiation Holder 30' and the Firing Contacts Substrate 60' are coupled together.

Figure 23:
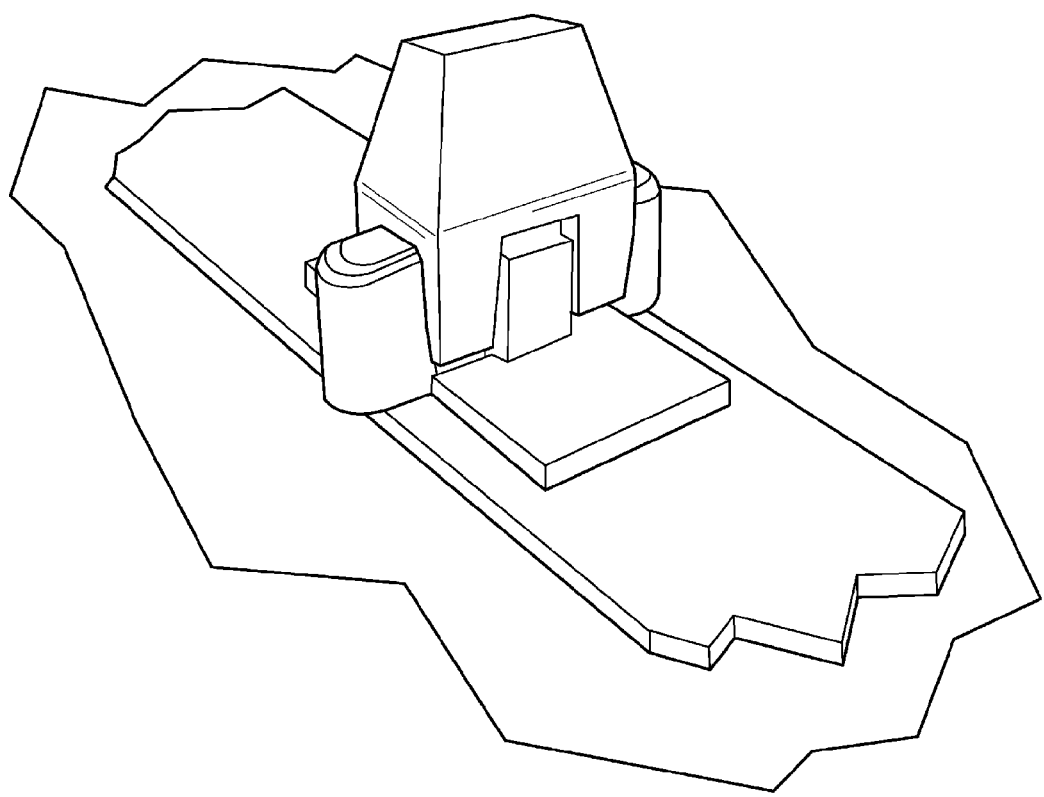
FIG. 23 illustrates an exemplary placement of a coupled Initiation Holder and Firing Contacts Substrate of the dual initiation structure in the center of a prepared Strip of Sheet Explosive.

As shown in illustrations depicting the second exemplary embodiment in FIGS. 11 and 12, the Strip of Sheet Explosive 80' is mounted under the Firing Contacts Substrate 60' and the Strip Coupling Means 92'. As shown in exemplary embodiments in FIGS. 16A and 16B, the Strip of Sheet Explosive 80' comprises a Strip Explosive Top 81'; a Strip Explosive Bottom 82'; Strip Explosive Ends, 83' and 84'; and Strip Explosive Edges, 85' and 86'. The Strip of Sheet Explosive 80' is coupled to the dual initiation structure of the DISC by disposing the Strip Coupling Means 92' to the Strip Explosive Top 81' of the Strip of Sheet Explosive 80' and to the Bottom Side 69' of the Firing Contacts Substrate 60'. As shown in FIG. 23, when coupling the Substrate 60' with the Strip 80', a portion of the surface area (e.g., generally half the surface area) of each of the Firing Contacts, 52' and 54', are aligned to abut the Strip Explosive Top 81' of the Strip of Sheet Explosive 80', while the remaining portion of the surface area of each of the Firing Contacts, 52' and 54', are exposed and extend beyond the Strip Explosive Edges, 85' and 86', and do not abut the Strip Explosive Top 81'. By ensuring that a portion of the surface area of each of the Firing Contacts, 52' and 54', extends beyond the Strip Explosive Edges, 85' and 86', and do not abut the Strip Explosive Top 81', the Strip of Sheet Explosive 80' will detonate completely once the invention is initiated.

Figure 16A:
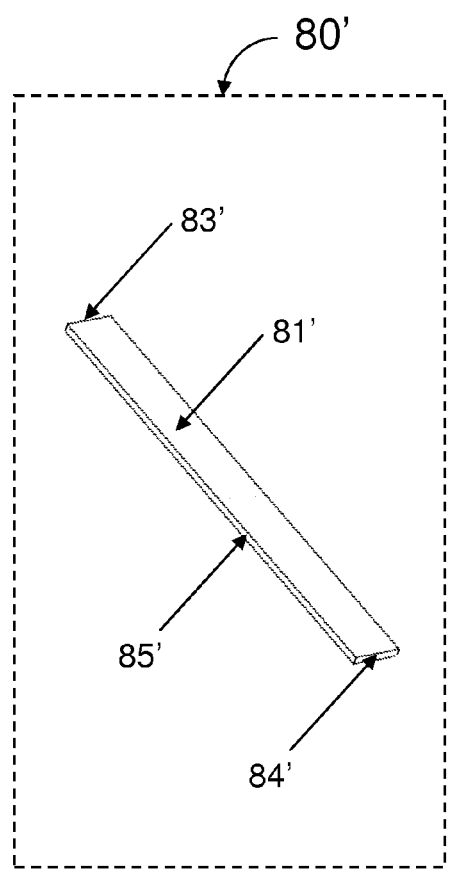
FIGS. 16A and 16B illustrate isometric views of exemplary configurations of a Strip of Sheet Explosive according to a second exemplary embodiment of the invention.
Figure 16B:
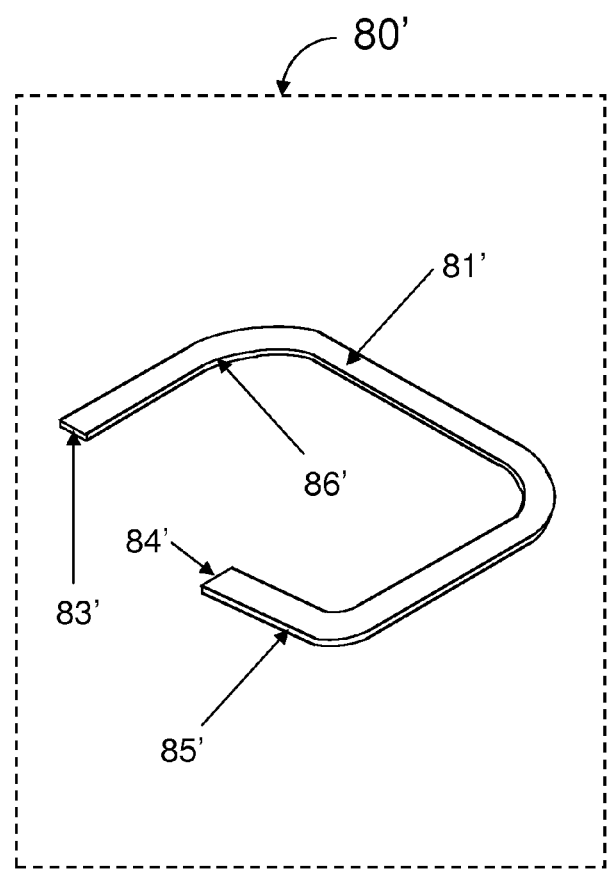

The illustration in FIG. 16A shows an exemplary configuration of the Strip of Sheet Explosive 80' as a straight strip. It should be noted, however, the Strip 80' is not limited to straight strip configuration. As long as the Strip Explosive Ends, 83' and 84', do not touch, the Strip 80' can be configured in a wide variety of orientations including as a straight strip, or as curved strip, or as combination straight and curved strip (as shown in an exemplary configuration in FIG. 16B). The detonation of the Strip of Sheet Explosive 80' creates a fracture in the target according to the configuration of the Strip 80' emplaced on the target, and thereby creates a breach in the target along a generally single fracture contour with a breach pattern that is generally a geometric, a polygonal, or a free-form shape. The Strip of Sheet Explosive 80' can be constructed from a variety of materials, including PETN-based, or RDX-based, or similar explosive charges, and generally comprises a PETN-based sheet explosive. It should be noted that although sheet explosive is generally preferred for the Strip of Sheet Explosive 80', this is not a limitation of the present invention. The explosive charge of the Strip of Sheet Explosive 80' can also be comprised of a block of trinitrotoluene explosive, or of a bar of Composition C-4 explosive, or other similar explosive charge.

In order to interface the DISC 100' with a target, a Target Interface Means 93' is disposed between the Strip Explosive Bottom 82' and the Target 200', as shown in FIG. 12. The Target Interface Means 93' comprises any type of suitable interfacing material or mechanism or combination thereof, including hydrogels, adhesives, two-sided tape, or similar item, that enables the Strip Explosive Bottom 82' to be emplaced in close proximity to the surface of the Target 200', and is as thin as possible so that it does not attenuate the explosive shock wave into the target structure.

As illustrated in FIG. 12 and as described above, the DISC 100' comprises an efficient explosive firing train that communicates detonation from a single Initiation Means 10' through two separate Firing Contacts, 52' and 54', and to the Strip of Sheet Explosive 80'. As identified above, by ensuring that a portion of the surface area for each of the Firing Contacts, 52' and 54', extends beyond the Strip Explosive Edges, 85' and 86', and do not abut the Strip Explosive Top 81', the Strip of Sheet Explosive 80' will detonate completely once the present invention is initiated. The explosive firing train comprises the Initiation Means 10' and the Firing Contacts Pack 50'. The components configuring the explosive firing train of the DISC 100' are shown in FIG. 12 as marked with gray hatching. The explosive firing train is configured and coupled with the dual initiation structure of the DISC. The dual initiation structure comprises the Initiation Holder 30' and the Firing Contacts Substrate 60', and as described above, is prepared by coupling together the Initiation Holder 30' and the Firing Contacts Substrate 60'. In operation, the Initiation Means 10' communicates detonation through the explosive firing train and to the Strip of Sheet Explosive 80', such that the Strip of Sheet Explosive 80' is initiated at the Firing Contacts, 52' and 54', with a high degree of isochronicity.

By varying the dimensions of the length, width, and thickness of the strip explosive charge of the Strip of Sheet Explosive, a variety of metallic target structures can be breached. For various exemplary embodiments of the invention applied against metallic targets, the width of the strip explosive charge is generally sized to at least twice the thickness of a target. For example, a one-inch wide strip of sheet explosive can be used against a one-half inch thick steel target. In addition, for various exemplary embodiments of the invention, the thickness of the strip explosive charge is generally sized to be approximately equal to the thickness of a target. For example, a one-half inch thick strip of sheet explosive can be used against one-half inch thick steel target. And, for various exemplary embodiments of the invention, the length of the strip explosive charge is generally sized according to a desired length for a generally single contour fracture in a target; that is, the length of a generally single fracture contour that creates a desired breach and a breach pattern in the target, generally determines the length of the strip of sheet explosive for a DISC apparatus. By dimensioning the strip explosive charge according to the sized width, the sized thickness, and the sized length, the Strip of Sheet Explosive can be dimensioned and made according to the requirements of an application. In addition, the strip explosive charge of the Strip of Sheet Explosive can also be configured as straight strip, or as curved strip, or as combined straight and curved strip in the length dimension. The detonation of the Strip of Sheet Explosive creates a fracture in the target according to the configuration of the Strip emplaced on the target, and thereby creates a breach in the target along a generally single fracture contour with a breach pattern that is generally a geometric, a polygonal, or a free-form shape.

For various exemplary embodiments of the invention, the dimensions of the Strip of Sheet Explosive generally range from 0.75 inches to 12 inches in width; from 0.04 inches to two inches in thickness; and from six inches to many feet in length. Note, however, that these general ranges for width, thickness, and length are intended for illustration purposes only and are not intended to limit the scope, nor intended as a limitation to the present invention.

Figure 17A:
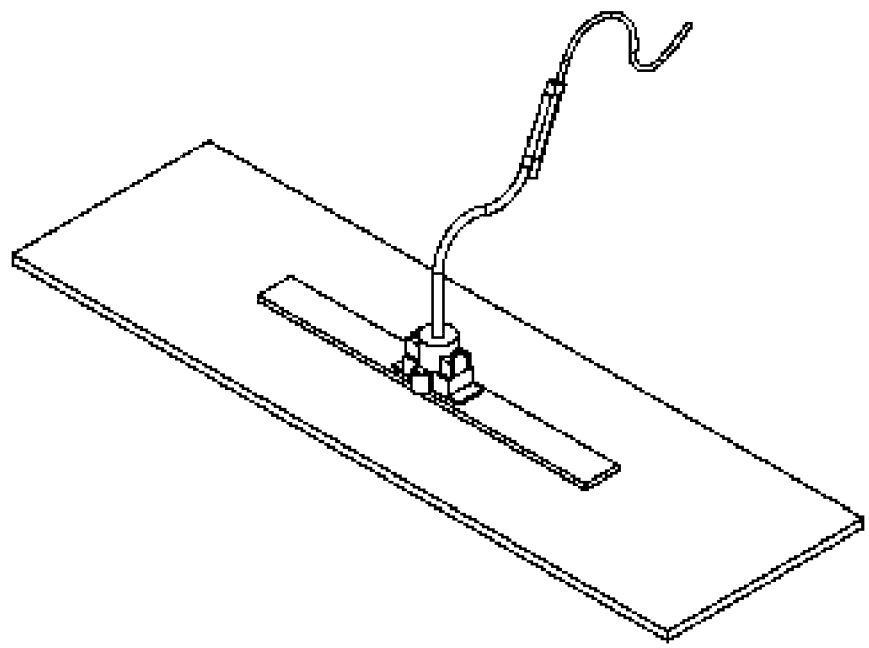
FIGS. 17A, 17B, and 17C illustrate a first exemplary configuration of a Dual Initiation Strip Charge apparatus according to a first exemplary embodiment of the invention and a breach pattern resulting from a fracture in, and a breach of a target.
Figure 17B:
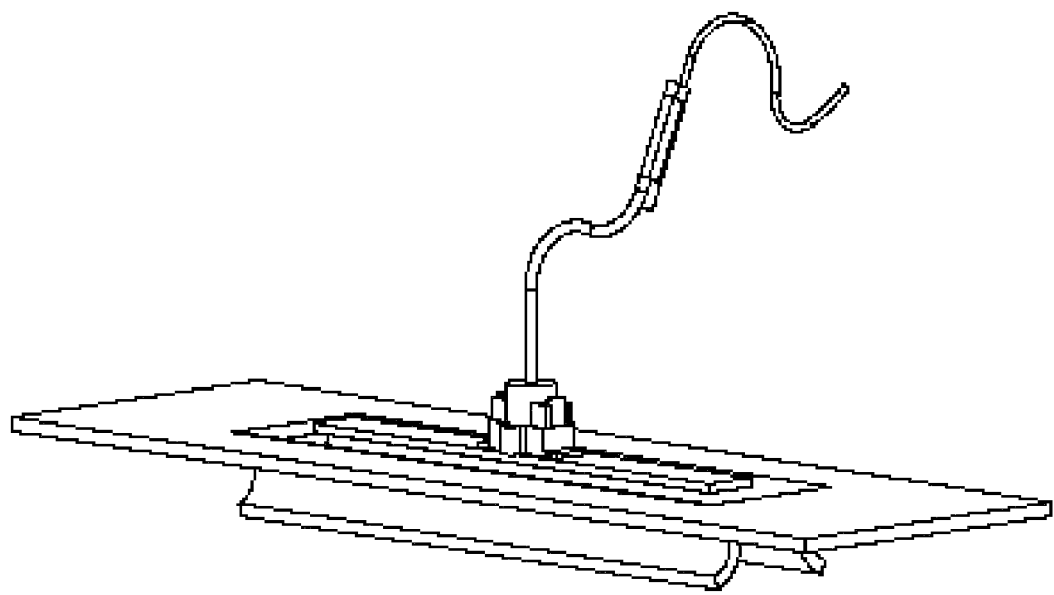
Figure 17C:
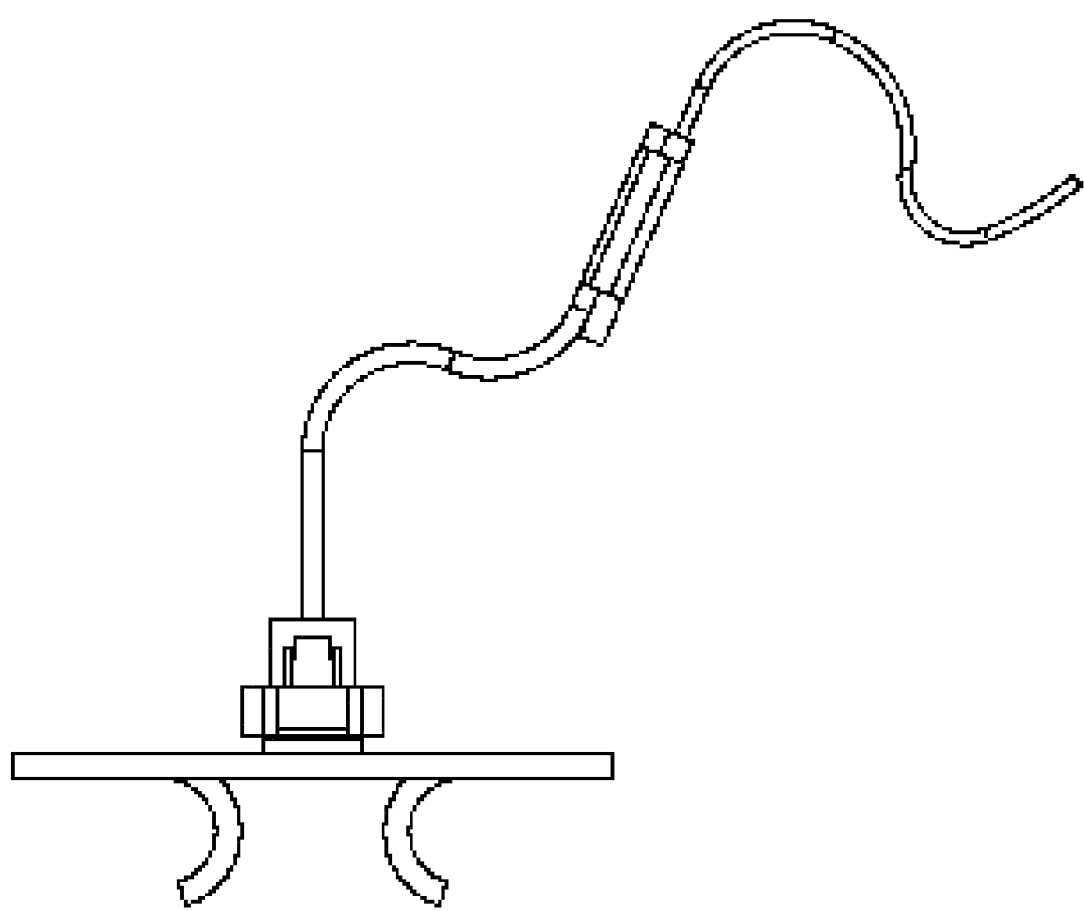
Figure 19A:
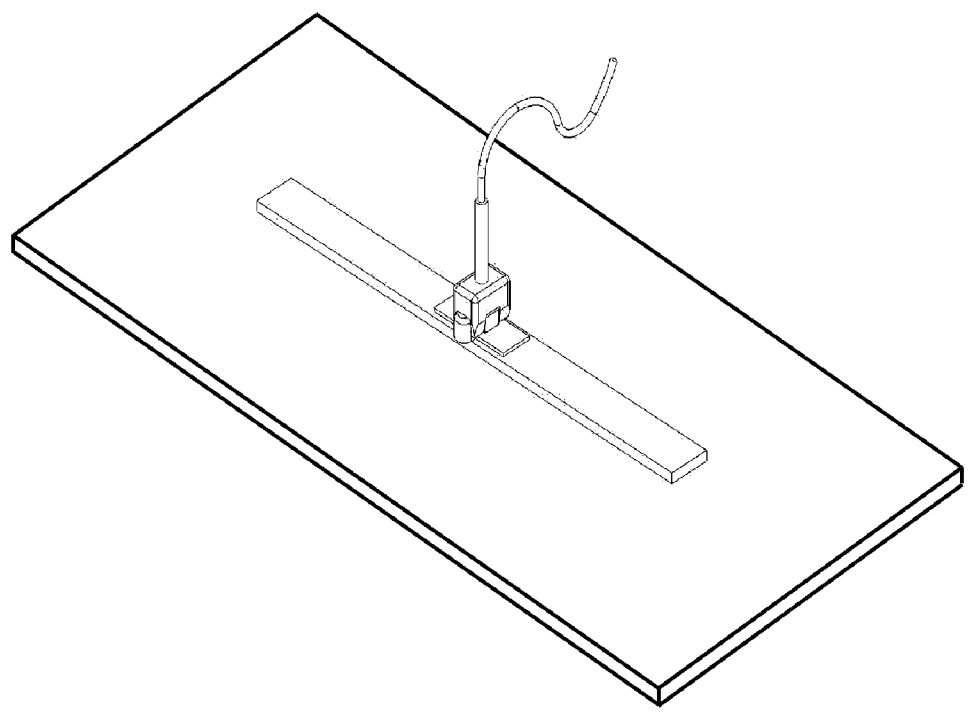
FIGS. 19A, 19B, and 19C illustrate a first exemplary configuration of a Dual Initiation Strip Charge apparatus according to a second exemplary embodiment of the invention and a breach pattern resulting from a fracture in, and a breach of a target.
Figure 19B:
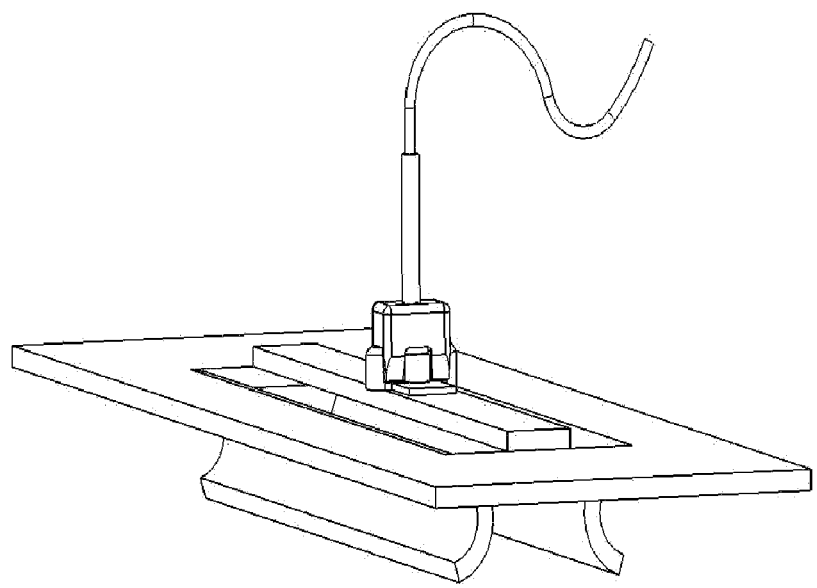
Figure 19C:
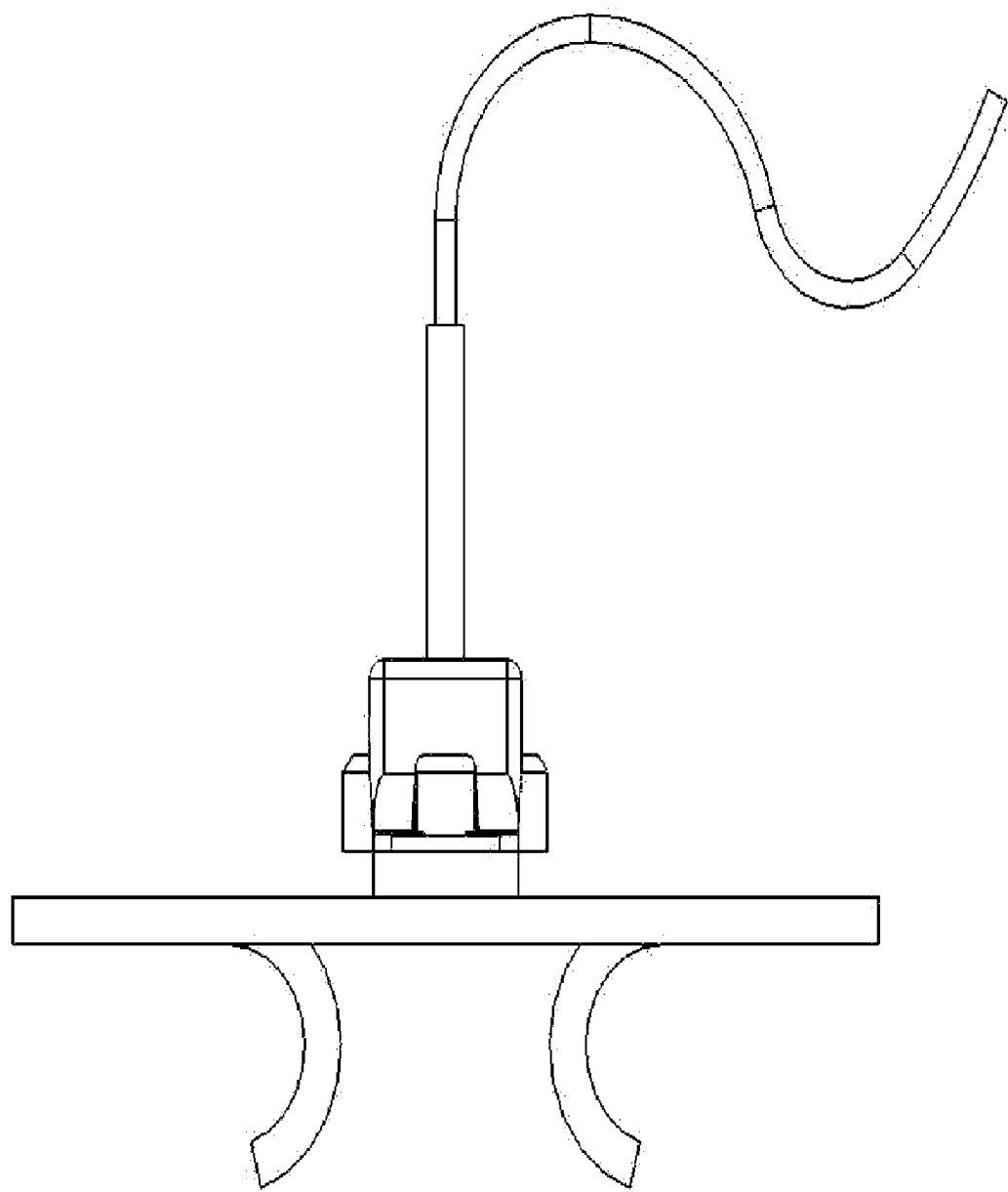

In an actual test that utilized a seven-foot long, 0.5 inch wide, and 0.25 inch thick piece of C-6 high explosive configured for the Strip of Sheet Explosive, a 0.25 inch mild steel target was breached while producing little to no fragments. In an actual test, a first exemplary configuration of the first exemplary embodiment of the DISC apparatus invention with the Strip of Sheet Explosive dimensions identified created a breach in a target with a breach pattern and is conceptually illustrated in FIGS. 17A, 17B, and 17C. In another test, a first exemplary configuration of the second exemplary embodiment of the DISC apparatus invention with the Strip of Sheet Explosive dimensions identified created a breach in a target with a breach pattern and is conceptually illustrated in FIGS. 19A, 19B, and 19C. As shown in this first exemplary configuration for these two exemplary embodiments, the Strip of Sheet Explosive is configured with a straight strip explosive charge.

Figure 18A:
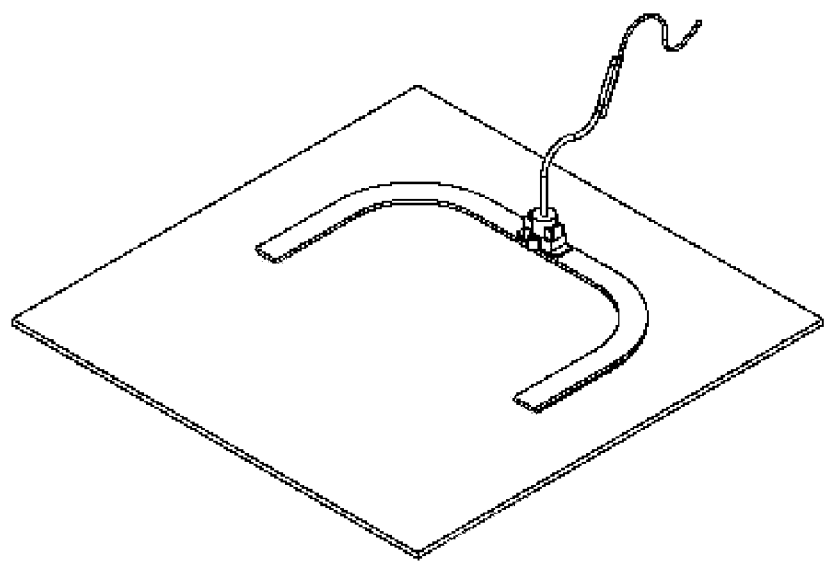
FIGS. 18A, 18B, 18C, and 18D illustrate a second exemplary configuration of a Dual Initiation Strip Charge apparatus according to a first exemplary embodiment of the invention and a breach pattern resulting from a fracture in, and a breach of a target.
Figure 18B:
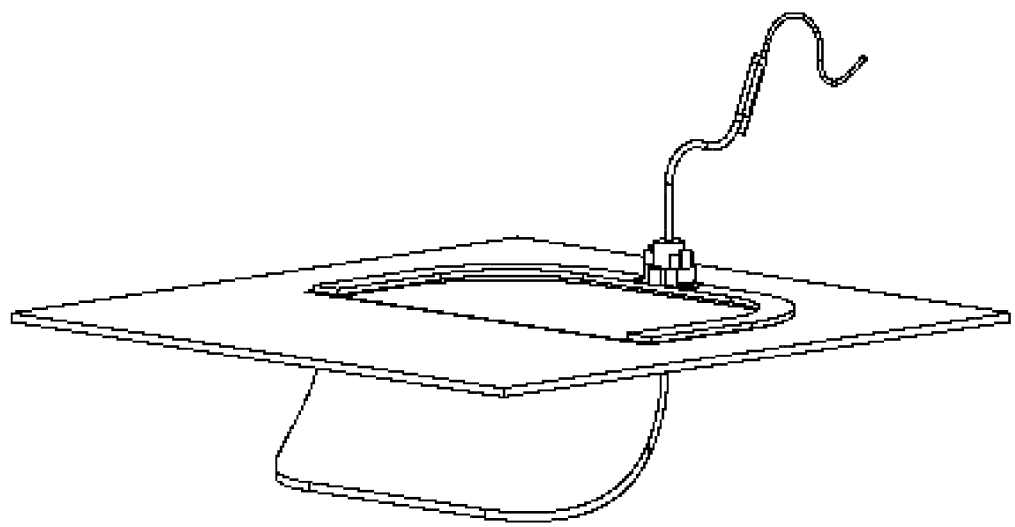
Figure 18C:
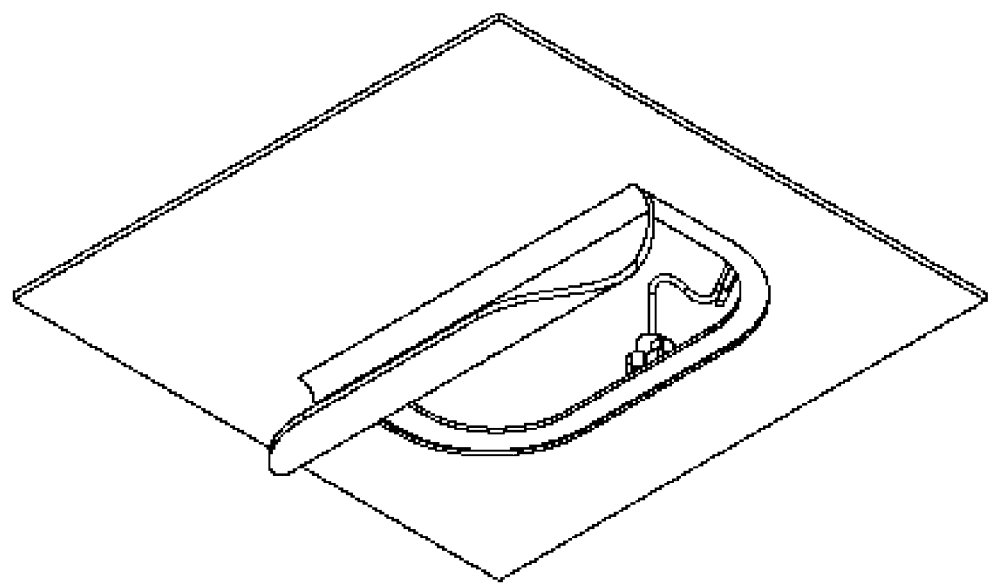
Figure 18D:
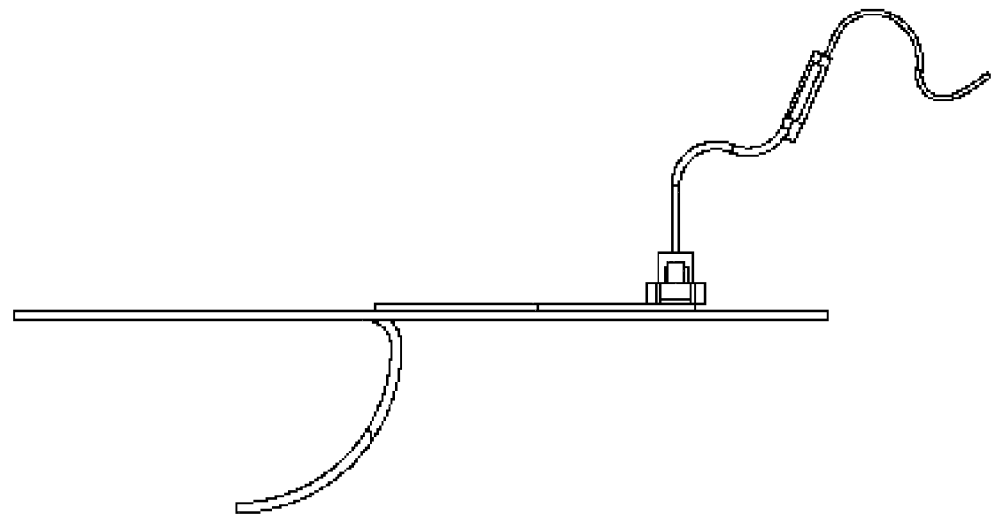
Figure 20A:
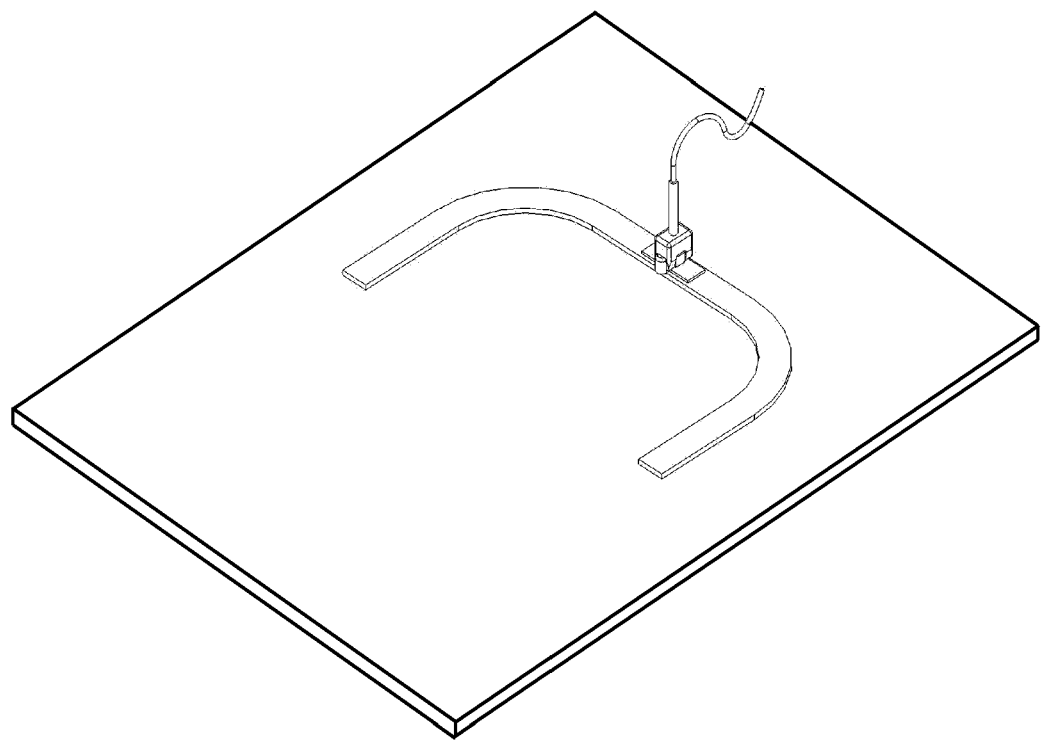
FIGS. 20A, 20B, 20C, and 20D illustrate a second exemplary configuration of a Dual Initiation Strip Charge apparatus according to a second exemplary embodiment of the invention and a breach pattern resulting from a fracture in, and a breach of a target.
Figure 20B:
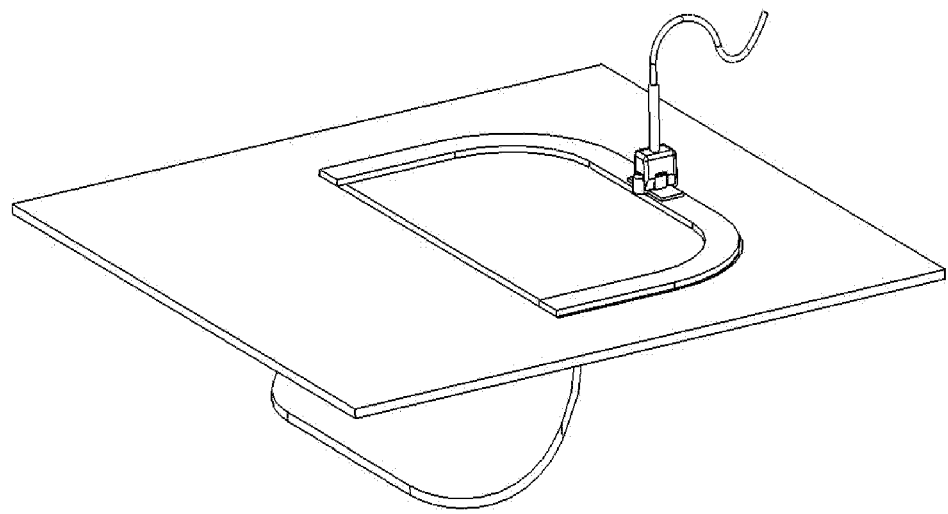
Figure 20C:
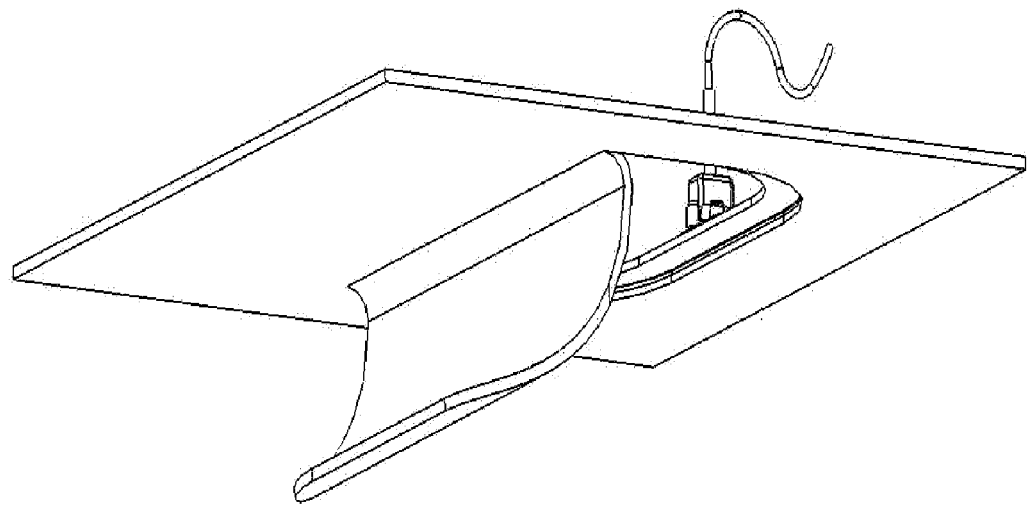
Figure 20D:
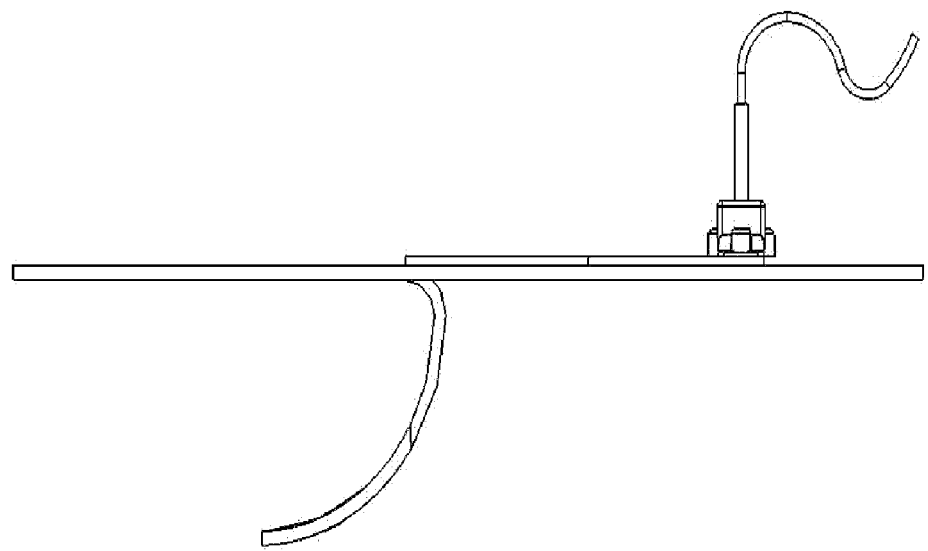

As identified above, the Strip of Sheet Explosive is not limited to configuration as a straight strip. By varying the configuration of the strip explosive charge for the DISC apparatus invention, a wide range of geometric, polygonal, or free-form breach patterns can be created in a target. As illustrated in a second exemplary configuration of the first exemplary embodiment in FIGS. 18A-18D, and in a second exemplary configuration of the second exemplary embodiment in FIGS. 20A-20D, a strip of C-6 high explosive can be implemented as the Strip of Sheet Explosive and can generally be shaped with a combination of straight areas and 90 degree turns. In this second exemplary configuration, the Strip of Sheet Explosive comprises two generally 90 degree turns and three straight areas. The detonation of the Strip of Sheet Explosive creates a breach in a target and a breach pattern illustrated conceptually in FIGS. 18B, 18C and 18D for the second exemplary configuration of the first exemplary embodiment, and creates a breach in a target and a breach pattern illustrated conceptually in FIGS. 20B, 20C and 20D for the second exemplary configuration of the second exemplary embodiment.

In addition, a third exemplary configuration applicable for embodiments of the DISC apparatus invention is shown in FIGS. 21A and 21B. As shown in FIG. 21A, a strip of C-6 high explosive can be implemented as the Strip of Sheet Explosive and configured as a "balloon-like"-shaped pattern on the target. The detonation of the Strip of Sheet Explosive in this exemplary configuration creates a breach in the target and a corresponding "balloon-like" breach pattern as illustrated in FIG. 21B.

The various exemplary configurations described above demonstrate the capability of the present invention to fracture and breach a target, and thereby create a breach pattern of various geometric, polygonal, or free-form shapes in a target.

The DISC apparatus invention possesses novel characteristics that address a wide variety of explosive charge applications. The DISC apparatus addresses unmet needs by providing an explosive charge that can be implemented as an inexpensive, easily- and quickly-rendered apparatus; providing the capability to fracture, cut, or breach metallic targets; providing the capability to breach extremely long metallic targets, and the capability to fracture and breach a target with a breach pattern of various geometric, polygonal, or free-form shapes in a target; providing the capability of producing generally fragment-free scattering in the surroundings of a target; and providing the capability of producing generally no spallation at the back of a target surface.

The design of the DISC apparatus invention provides numerous advantages when compared to previous explosive charge configurations. The DISC apparatus design facilitates rapid construction of an explosive charge in the field; ensures the use of a consistent, repeatable, and controlled amount of high explosive to create a breach in a target; focuses the shock collision phenomena in a target; realizes an efficient explosive firing train that communicates detonation from a single detonator to two separate contacts on a strip of explosive charge; creates a fracture in the target along a single fracture contour, thus creating a breach in the target's structure; produces less spallation than explosive charge configurations that induce multiple fracture lines within a target; and minimizes high-speed fragment scattering, and thereby, minimizes harm to operators.

Methods for Making and Implementing a Dual Initiation Strip Charge Apparatus

The methods for making and implementing a DISC apparatus comprise steps for making, integrating, configuring, and coupling components from sophisticated, yet inexpensive materials and techniques. The two main components of the dual initiation structure of the DISC apparatus invention can be created comprising Steps for Rapid Prototyping. The Steps for Rapid Prototyping can incorporate one or a combination of a wide range of rapid prototyping techniques including fused deposition modeling (FDM), stereolithography (SLA), selective laser sintering (SLS), rapid injection molding, or other similar techniques. Rapid Prototyping Steps enable the creation of an intricate, sophisticated, and efficient explosive firing train and dual initiation structure of a DISC apparatus at a fraction of the cost compared to other manufacturing processes. The methods for making and implementing a DISC apparatus comprises steps for the design and preparation of efficient metering of explosive integrated within the cavities of the components of the dual initiation structure of the DISC, and can be quickly implemented by configuring and coupling the explosive firing train with the dual initiation structure of the DISC. Similarly, time consuming or complicated connectors for coupling the components of the apparatus are eliminated as the methods for making and implementing a DISC apparatus integrate coupling mechanisms that are configured within the dual initiation structure of the DISC. The methods for making and implementing comprise these or similar steps and enable the DISC apparatus invention to be created as an inexpensive, easily- and quickly-rendered apparatus and to be implemented quickly in the field.

A Detonating Link 20 of the present invention is prepared by cutting a length of Detonating Link Cord 21 as shown in an exemplary embodiment in FIG. 3. The Detonating Link 20 can be constructed from a variety of cords useful for detonating explosive charges. A Detonating Link 20 comprising a PETN-based explosive charge with a general core load of 50 grains/foot is generally recommended, however this is not a limitation of the invention, as other explosive charge materials with core loads generally ranging from five grains/foot to 100 grains/foot can also be used. The Detonating Link 20 length generally ranges six inches to 16 inches however this is not a limitation of the invention. A recommended Detonating Link 20 length for many applications is generally eight inches. A Detonating Link Knot 22 is tied at one end of the Detonating Link Cord 21.

A Strip of Sheet Explosive 80 is prepared as shown in an exemplary embodiment in FIGS. 1A, 1B, 4A, 4B, 4C, 9A and 9B. The Strip of Sheet Explosive 80 can be constructed from a variety of materials, including PETN-based, or RDX-based, or similar explosive charges, and generally comprises a PETN-based sheet explosive. It should be noted that although sheet explosive is generally preferred for the Strip of Sheet Explosive 80, this is not a limitation of the present invention. The explosive charge of the Strip of Sheet Explosive 80 can also be comprised of a block of trinitrotoluene, or of a bar of Composition C-4 explosive, or other similar explosive charge.

The size of the Strip of Sheet Explosive 80 is generally determined according to the size and thickness of a target. For various exemplary embodiments of the present invention, the width of the strip explosive charge is generally sized to at least twice the thickness of a target. For example, a one-inch wide strip of sheet explosive can be used against a one-half inch thick steel target. In addition, for various exemplary embodiments of the invention, the thickness of the strip explosive charge is generally sized to be approximately equal to the thickness of a target. For example, a one-half inch thick strip of sheet explosive can be used against one-half inch thick steel target. And, for various exemplary embodiments of the invention, the length of the strip explosive charge is generally sized according to a desired length for a generally single contour fracture in a target; that is, the length of a generally single fracture contour that creates a desired breach and breach pattern in the target according to the needs of an application, generally determines the length of the strip of sheet explosive for making a DISC apparatus. By dimensioning the strip explosive charge according to the sized width, the sized thickness, and the sized length, the strip of sheet explosive can be made and customized for the requirements of an application. In addition, the strip of sheet explosive can also be configured as straight, or as curved, or as a combination of straight and curved strip in the length dimension in order to create a geometric, polygonal, or free-form shaped breach pattern in a target, and thereby fracture the target and create a breach in the target along a generally single fracture contour.

For various exemplary embodiments of the invention, the dimensions of the strip of sheet explosive generally range from 0.75 inches to 12 inches in width; from 0.04 inches to two inches in thickness; and from six inches to many feet in length. Note, however, these general ranges for the width, thickness, and length of the strip of sheet explosive are intended for illustration purposes only and are not presented as a limitation of the present invention.

The Detonating Link Holder 30 is created via Steps for Rapid Prototyping, as identified above. As shown in an exemplary embodiment in FIGS. 5A-5E, the Detonating Link Holder 30 comprises at least two Snap Grooves, 33 and 34; a Holder Cavity 39; a Holder Housing 37; a Hole 32 extending from a Top Side 31 through to the Holder Cavity 39. The design of the Detonating Link Holder is devised to integrate the sizing of the Hole 32; the sizing of the Holder Cavity 39 and the Holder Housing 37; and the design of the Snap Grooves, 33 and 34; into a Detonating Link Holder design that can easily implement Steps for Rapid Prototyping in order to make a Detonating Link Holder 30. The Holder Diameter of the Hole 32 is sized to be larger than the Cord Diameter of the Detonating Link Cord 21 and is configured to accommodate the insertion of the Detonating Link Cord 21; and the Holder Diameter of the Hole 32 is sized to be smaller than the Knot Diameter of the Detonating Link Knot 22 in order to prohibit passage of the Knot 22. The size of the Holder Cavity 39 is configured to accommodate population by the insertion of the Detonating Link Knot 22 within the Holder Cavity 39; as well as to accommodate population by the filling, pressing and tamping of the Detonating Pack 40, thus encapsulating the Detonating Link Knot 22.

The Firing Contacts Substrate 60 is also created via Steps for Rapid Prototyping, as identified above. As shown in an exemplary embodiment in FIGS. 8A-8D, the Firing Contacts Substrate 60 comprises a Firing Contacts Channel 61; two Firing Contact Wells, 62 and 63; two Firing Contact Well Centers, 68 and 69, associated with the Wells, 62 and 63; at least two Snap Hooks, 64 and 65; a Substrate Top Side 66; and a Substrate Bottom Side 67. The design of the Firing Contacts Substrate is devised to integrate the Firing Contact Wells, 62 and 63; the Firing Contacts Channel 61; the design of the Snap Hooks, 64 and 65; the distance between the Firing Contact Well Centers, 68 and 69; and the size of the Substrate 60; into a Firing Contacts Substrate design that can easily implement Steps for Rapid Prototyping in order to make a Firing Contacts Substrate 60. As shown in an exemplary embodiment in FIGS. 1B and 4C, the Firing Contacts Channel 61 and the two Firing Contact Wells, 62 and 63, of the Firing Contacts Substrate design form a portion of an efficient firing train cavity that accepts the Firing Contacts Pack 50 as a metered amount of high explosive. The firing train cavity is configured and integrated as a portion of the dual initiation structure that supports the configuration of the explosive firing train between the Initiation Means 10 and the Strip of Sheet Explosive 80. The Snap Hooks, 64 and 65, are configured to operatively couple with the Snap Grooves, 33 and 34, of the Detonating Link Holder 30.

The length dimension of the Substrate Bottom Side 67 is sized to be shorter than the length of the Strip of Sheet Explosive 80. The distance between the Firing Contact Well Centers, 68 and 69, (shown in FIG. 8D) is sized to be generally equal to the width of the Strip of Sheet Explosive 80. In addition, the Firing Contact Well Centers, 68 and 69, are each generally located at the center of the respective apertures of the Firing Contact Wells, 62 and 63.

The apertures of the Firing Contact Wells, 62 and 63, are illustrated as circular-shaped in FIGS. 8A-8E, however, this is not a limitation of the present invention, as the apertures of the Firing Contact Wells, 62 and 63, can be constructed in a wide range of geometric, polygonal and free-form shapes including circular-, elliptic-, square-, or rectangular-shaped, or any combination thereof. For all apertures of the Firing Contact Wells, 62 and 63, the larger dimension of the aperture (e.g., the larger dimension as defined previously) should be configured as generally parallel with the edge of the Strip of Sheet Explosive 80. As shown in FIG. 8D, the width dimension of the Substrate Bottom Side 67 and is then determined and sized to be generally equal to the distance between the Firing Contact Well Centers, 68 and 69, less the smaller dimension (e.g., the smaller dimension as defined previously) of the Firing Contact Well 62.

The distance between the Firing Contact Well Centers, 68 and 69, is determined to be generally equal to the width of the Strip of Sheet Explosive 80 in order to ensure that a portion of the surface area (generally half the surface area) of each of the Firing Contacts, 52 and 54, abut the Strip of Sheet Explosive 80, while the remaining surface area of each of the Firing Contacts, 52 and 54, are exposed and extend beyond the Strip Explosive Edges, 85 and 86, and do not abut the Strip Explosive Top 81. By ensuring that a portion of the surface area of each of the Firing Contacts, 52 and 54, do not abut the Strip of Sheet Explosive 80, the Strip of Sheet Explosive 80 will detonate completely once the invention is initiated. It should be noted, however, that this relationship is provided to identify general sizing guidance of the Firing Contacts Substrate 60 and is not presented as a limitation to the invention. The Strip of Sheet Explosive 80 will detonate as long as at least a portion of the surface area of each Firing Contact, 52 and 54, abuts or contacts the Strip of Sheet Explosive 80 in the DISC apparatus.

The Detonating Link Cord 21 is inserted through the Holder Cavity 39 and then through the Hole 32 of the Detonating Link Holder 30 until the Detonating Link Knot 22 is completely contained within the Holder Cavity 39. The Detonating Pack 40 is prepared by filling, pressing and tamping Detonating Pack 40 material into the voids of the Holder Cavity 39 until the Detonating Link Knot 22 is encapsulated within the Holder Cavity 39, the Holder Cavity 39 is completely filled, and until an excess amount of Detonating Pack 40 material extends beyond the Detonating Link Holder Bottom Side 38. A knife edge is pressed against and conveyed across the Detonating Link Holder Bottom Side 38 until the excess amount of Pack 40 material is removed from the Detonating Pack 40 and the Detonating Pack Bottom Side 43 remains. After the excess amount is removed, the Detonating Pack Bottom Side 43 is generally flat and is generally coplanar with the Detonating Link Holder Bottom Side 38 as illustrated in FIG. 5F. In addition, the Detonating Link Holder 30 is now populated with the encapsulated Detonating Link Knot 22 and Detonating Pack 40.

Figure 8E:
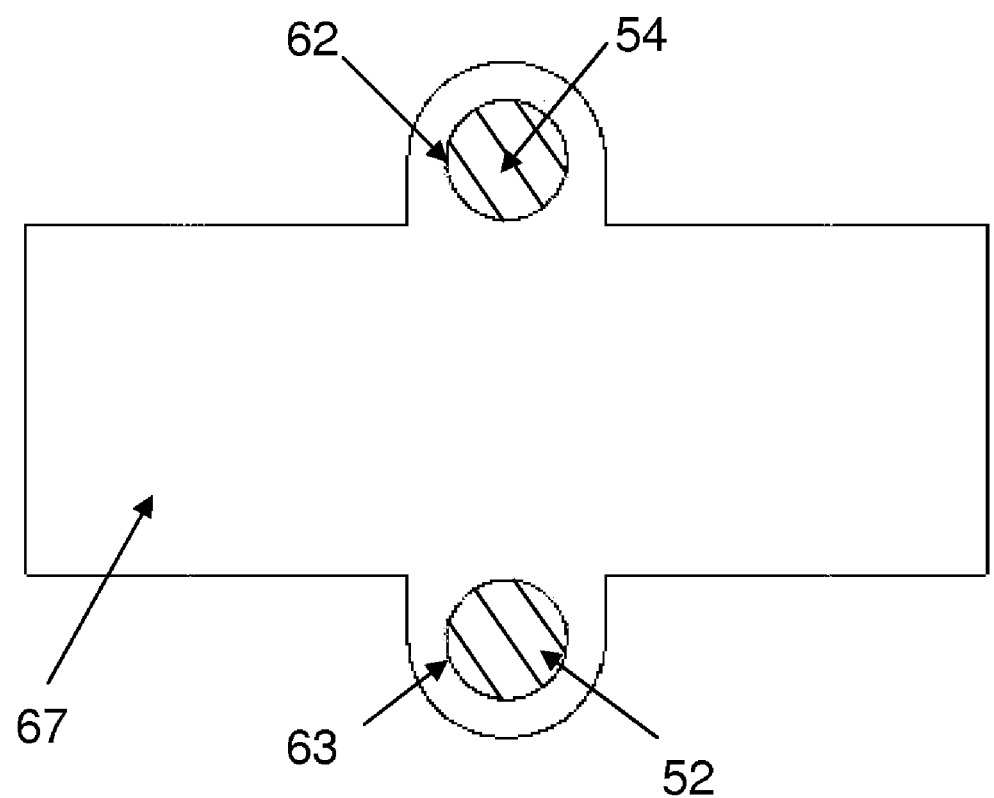
FIG. 8E illustrates a bottom view of the Firing Contacts Substrate with the Firing Contact Wells populated with Firing Contacts Pack according to a first exemplary embodiment of the invention.

The Firing Contacts Pack 50 is prepared by filling the Firing Contact Wells, 62 and 63, with Firing Contacts Pack 50 material from the top side of the Firing Contacts Substrate 60, and the Pack 50 material is pressed and tamped into the Wells. The Firing Contact Wells, 62 and 63, are further filled, pressed and tamped until no voids remain in the Wells, 62 and 63, and the impressed Firing Contacts Pack 50 material configures a Firing Contact 52, a Firing Contact Packing 53, a Firing Contact 54, and a Firing Contact Packing 55 of the Firing Contacts Pack 50. The surface of the Firing Contacts, 52 and 54, are generally flat and, as shown in FIG. 8E, are also configured to be generally co-planar with the Substrate Bottom Side 67 of the Firing Contacts Substrate 60. The Firing Contacts Channel 61 is similarly filled, pressed and tamped with Firing Contacts Pack 50 material to configure a Firing Contacts Channel Packing 51 of the Firing Contacts Pack 50. Once all voids have been filled with impressed Firing Contacts Pack 50 material, the Firing Contacts Substrate 60 is populated with the Firing Contacts Pack 50.

Once populated within the Firing Contacts Substrate 60, the Firing Contacts Pack 50 supports continuity of the invention's explosive firing train through configuration and integration of the Firing Contacts Channel Packing 51 and the Firing Contacts, 52 and 54. As an integrated part of the explosive firing train, the Firing Contacts Pack 50 is configured as a metered amount of high explosive that supports efficient detonation communication between an Initiation Means 10 and the Strip of Sheet Explosive 80.

The dual initiation structure comprises the Detonating Link Holder 30 and the Firing Contacts Substrate 60. The dual initiation structure is prepared by coupling the populated Detonating Link Holder 30 with the populated Firing Contacts Substrate 60. When coupling, the Snap Grooves, 33 and 34, are aligned with the Snap Hooks, 64 and 65, and the Detonating Link Holder 30 is pressed towards the Firing Contacts Substrate 60 until the Detonating Link Holder Bottom Side 38 is seated against the Substrate Top Side 66. The coupling of the Detonating Link Holder 30 with the Firing Contacts Substrate 60 ensures a sufficiently rigid dual initiation structure for the DISC apparatus. Once the dual initiation structure is prepared, it is then coupled with the efficient explosive firing train. The coupled dual initiation structure and explosive firing train enables communication of detonation from a single initiation source to two separate contacts on a strip of explosive charge.

A Strip Coupling Means 92 is disposed between the Firing Contacts Substrate 60 and the Strip of Sheet Explosive 80, and is generally applied to cover the area of the Substrate Bottom Side 67, with the exception that the Firing Contacts, 52 and 54, remain uncovered. The Strip Coupling Means 92 comprises any type of suitable coupling material or mechanism or any combination thereof that has the capability to quickly couple and bring into close proximity the Firing Contacts Substrate 60 with the Strip of Sheet Explosive 80, such as two-sided tape, adhesive, VELCRO [trade] and similar items. The Means for Strip Coupling 92 generally comprises a strip of two-sided tape.

Figure 22:
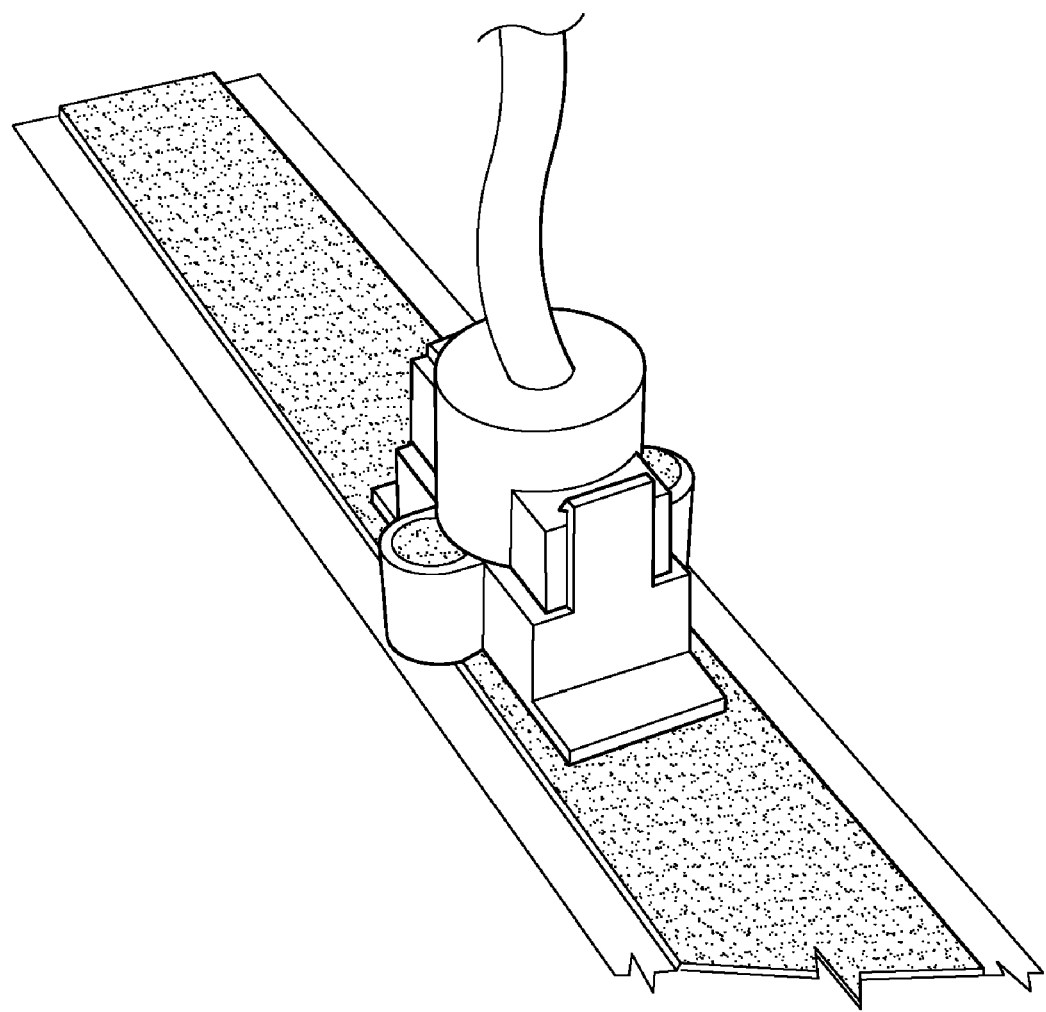
FIG. 22 illustrates an exemplary placement of a coupled Detonating Link Holder and Firing Contacts Substrate of the dual initiation structure in the center of a prepared Strip of Sheet Explosive.

As shown in FIG. 22, the coupled Detonating Link Holder 30 and Firing Contacts Substrate 60 of the dual initiation structure is emplaced generally in the center of the prepared Strip of Sheet Explosive 80. Such placement ensures that a portion of the surface area (i.e., the surface area not in contact with the Strip of Sheet Explosive 80) for each of the Firing Contacts, 52 and 54, are exposed and extend beyond the Strip Explosive Edges, 85 and 86, and do not abut the Strip Explosive Top 81, and also ensure that the exposed surface area for the Firing Contacts, 52 and 54, are generally equal on both sides; doing so ensures complete detonation of the Strip of Sheet Explosive 80 once the DISC apparatus is initiated. The Strip Coupling Means 92 applied to the Substrate Bottom Side 67, as identified above, is capable of quickly coupling the coupled Holder 30 and Substrate 60 of the dual initiation structure with the Strip Explosive Top 81 of the Strip of Sheet Explosive 80.

In order to interface the DISC 100 with a target, a Target Interface Means 93 is generally disposed between the Strip Explosive Bottom 82 and the Target 200. The Target Interface Means 93 can be first applied to the Target 200 (however this is not a limitation of the method), and the Strip Explosive Bottom 82 then emplaced on the Target Interface Means 93 while the DISC 100 is similarly emplaced in close proximity to the Target 200. The Target Interface Means 93 comprises any type of suitable interfacing material or mechanism or combination thereof, including hydrogels, adhesives, two-sided tape, or similar item, that enables the Strip Explosive Bottom 82 of the DISC 100 to be emplaced in close proximity to the surface of the Target 200, and that is as thin as possible so that it does not attenuate the explosive shock wave into the target structure. For many applications, the Target Interface Means 93 generally comprises a strip of two-sided tape.

As shown in FIGS. 1A, 1B, 4A, and 4B, an Initiation Means 10 is coupled to the Detonating Link Cord 21 of the Detonating Link 20. An exemplary embodiment of the Initiation Means 10 is illustrated in FIG. 2A and is shown comprising a detonator and a shock tube. Note, however, the Initiation Means 10 can comprise a wide range of initiation or detonation sources of commercial or military grade with capability to initiate the explosive firing train and detonate a strip of explosive charge. Various types of Means of Initiation that have the capability to initiate generally isochronal firing via the explosive firing train are preferred. The Initiation Coupling Means 91 comprises a wide range of materials, mechanisms, or combinations thereof, including tape, adhesives, VELCRO [trade], or similar items.

As illustrated in FIG. 10 and as described above, the DISC 100 apparatus realizes an efficient explosive firing train that communicates detonation from a single Initiation Means 10 through two separate Firing Contacts, 52 and 54, and to the Strip of Sheet Explosive 80. By ensuring that a portion of the surface area for each of the Firing Contacts, 52 and 54, extends beyond the Strip Explosive Edges, 85 and 86, and do not abut the Strip Explosive Top 81, the Strip of Sheet Explosive 80 will detonate completely once the present invention is initiated. The explosive firing train is prepared and comprises the Initiation Means 10, the Detonating Link 20, the Detonating Pack 40, the Firing Contacts Pack 50, and the Firing Contacts, 52 and 54. The components configuring the explosive firing train of the DISC apparatus are shown as marked with gray hatching in FIG. 10. The explosive firing train is configured and coupled with the dual initiation structure of the DISC. The coupled dual initiation structure and explosive firing train enables communication of detonation from a single initiation source to two separate contacts on a strip of explosive charge. In operation, the Initiation Means 10 communicates detonation through the explosive firing train and to the Strip of Sheet Explosive 80, such that the Strip of Sheet Explosive 80 is initiated at the Firing Contacts, 52 and 54, with a high degree of isochronicity.

Once the DISC 100 is interfaced with the Target 200, and the Initiation Means 10 is coupled to the Detonating Link 20, the DISC 100 can then be initiated by activating the Initiation Means 10.

The foregoing description of the embodiments and of the methods of the invention has been presented for the purpose of illustration; it is not intended to be exhaustive nor does it limit the invention to the precise forms or steps disclosed. Persons skilled in the relevant art can appreciate that many modifications and variations are possible in light of the above teachings; various modifications in the size, shape and materials, and various modifications in the methods, as well as various modifications in the details of the illustrations, may be made without departing from the spirit of the invention. It is therefore intended that the scope of the invention be limited not by this detailed description, but rather by the claims appended hereto.

What is claimed is:

1. An apparatus for creating a breach in a target, comprising:
   a strip of explosive charge coupled to a dual initiation structure wherein the strip of explosive charge comprises a top surface and a bottom surface, wherein the strip of explosive charge is substantially not contained within a housing, and wherein the bottom surface is capable of being interfaced with to the target;
   a first firing contact of an explosive firing train comprising a first surface area, wherein less than the entire first surface area of the first firing contact abuts the top surface of the strip of explosive charge and wherein a portion of the first surface area overhangs a first edge of the top surface of the strip of explosive charge;
   a second firing contact of the explosive firing train comprising a first surface area, wherein less than the entire first surface area of the second firing contact abuts the top surface of the strip of explosive charge and wherein a portion of the second surface area overhangs a second edge of the top surface of the strip of explosive charge; and
   means for initiating the explosive firing train and communicating a detonation from a single initiation source to the first and second firing contacts and detonating the strip of explosive charge, wherein the detonation operatively creates a fracture in the target along a single fracture contour and operatively creates the breach in the target.

2. The apparatus of claim 1, further comprising a second surface area of the first firing contact and further comprising a second surface area of the second firing contact; wherein the second surface area of the first firing contact is exposed and does not abut the top surface of the strip explosive, and wherein the second surface area of the second firing contact is exposed and does not abut the top surface of the strip explosive; and wherein the means for initiation detonates the strip of explosive charge completely.

3. The apparatus of claim 1, wherein the fracture is generally fragment-free, and wherein the breach is generally fragment-free.

4. The apparatus of claim 1, wherein the breach comprises a breach pattern, and wherein the breach pattern is a generally geometric shape, a generally polygonal shape, or a generally free-form shape.

5. The apparatus of claim 1, wherein the initiating means communicates the detonation through the first surface area of the first firing contact and through the first surface area of the second firing contact at substantially the same time.

6. The apparatus of claim 1, wherein the dual initiation structure further comprises a firing contacts substrate.

7. The apparatus of claim 6, wherein the initiation means is coupled to the explosive firing train.

8. The apparatus of claim 7, wherein the firing contacts substrate is operatively configured with the first firing contact; and wherein the firing contacts substrate is operatively configured with the second firing contact; and wherein the explosive firing train is operatively coupled with the dual initiation structure.

9. The apparatus of claim 8, wherein the firing contacts substrate further comprises a first firing contact well and a second firing contact well; and wherein the first firing contact well comprises a first well aperture and the second firing contact well comprises a second well aperture.

10. The apparatus of claim 9, wherein the first well aperture is operatively configured with the first firing contact, and wherein the second well aperture is operatively configured with the second firing contact.

11. The apparatus of claim 10, wherein the first well aperture is geometric-shaped, or polygonal-shaped or free-form shaped; and wherein the second well aperture is geometric-shaped, or polygonal-shaped or free-form shaped.

12. A method for making an apparatus for creating a breach in a target, comprising:
   preparing a strip of explosive charge, wherein the strip of explosive charge is substantially not contained within a housing and wherein the strip of explosive charge has a contour;
   preparing an explosive firing train, wherein the explosive firing train comprises a first firing contact and a second firing contact and means for initiating the explosive firing train and communicating a detonation from a single initiation source to the first and second firing contacts and detonating the strip of explosive charge, wherein the detonation operatively creates a fracture in the target along a single fracture contour and operatively creates the breach in the target, wherein the single fracture contour follows the contour of the strip of explosive charge;
   preparing a dual initiation structure;
   populating a dual initiation structure;
   coupling the explosive firing train with the dual initiation structure;
   coupling the dual initiation structure with the strip of explosive charge, wherein a portion of a surface area of each of the first and second firing contacts overhangs an edge of a top surface of the strip of explosive charge; and
   interfacing the strip of explosive charge with the target.

13. The method of claim 12, wherein the step of preparing an explosive firing train further comprising:
   preparing a detonating link and tying a detonating link knot at a first end of a detonating link cord;
   preparing a detonating pack;
   preparing a firing contacts pack; and
   coupling the means for initiation with a second end of the detonating link cord.

14. The method of claim 13, wherein the step of preparing a strip of explosive charge further comprising:
   sizing a width of a strip of explosive charge to at least twice the thickness of the target;
   sizing a thickness of the strip of explosive charge to be generally equal to the thickness of the target;
   sizing a length of the strip of explosive charge to be generally equal to a desired length of a generally single fracture contour in the target; and
   dimensioning the strip of explosive charge according to the sized width, the sized thickness, and the sized length, and making the strip of explosive charge.

15. The method of claim 14, wherein the step of preparing a dual initiation structure further comprising:
   creating a firing contacts substrate, wherein the step of creating a firing contacts substrate comprises:
      devising a firing contacts substrate design, wherein the firing contacts substrate design comprises a first firing contact well and a second firing contact well; wherein the first firing contact well comprises a first firing contact well center, a first firing contact well aperture, and a first dimension; and wherein the second firing contact well comprises a second firing contact well center, a second firing contact well aperture, and a second dimension;

sizing a first distance between the first firing contact well center and the second firing contact well center to be generally equal to the width of the strip of explosive charge;

sizing a width of a substrate bottom side to be generally equal to the first distance less the first dimension;

devising a snap coupling design, wherein the snap coupling design comprises a first snap hook and a second snap hook;

integrating the sized first distance between the first and second firing contact well centers, and the sized width of the substrate bottom side, and the devised snap coupling design with the firing contacts substrate design; and steps for prototyping the firing contacts substrate design and making a firing contacts substrate; and creating a detonating link holder, wherein the step of creating a detonating link holder comprises:

devising a detonating link holder design;

sizing a holder diameter of a hole in the detonating link holder, wherein the holder diameter of the hole is sufficiently greater than a cord diameter of the detonating link cord, and wherein the holder diameter of the hole is sufficiently less than a knot diameter of the detonating link knot;

sizing a holder cavity with the detonating link holder to be operatively capable of encapsulating the detonating link knot;

devising a first snap groove to be operatively capable of coupling with the first snap hook and a second snap groove to be operatively capable of coupling with the second snap hook;

integrating the sized holder diameter of the hole, and the sized holder cavity, and the first snap groove and the second snap groove into the detonating link holder design; and steps for prototyping the detonating link holder design and making a detonating link holder.

16. The method of claim 15, wherein the step of populating a dual initiation structure further comprising:

populating a detonating link holder, wherein the step of populating the detonating link holder comprises:

preparing the detonating pack, wherein the step of preparing the detonating pack comprises:

inserting the detonating link cord through the hole of the detonating link holder until the detonating link knot is completely contained within the holder cavity;

filling the detonating pack into the holder cavity until the detonating link knot is encapsulated within the holder cavity and an excess amount of detonating pack extends beyond a bottom side of the detonating link holder;

removing the excess amount from the detonating pack; and completing the preparation of the detonating pack; and populating a firing contacts substrate, wherein the step of populating the firing contacts substrate comprises:

preparing the firing contacts pack, wherein the step of preparing the firing contacts pack comprises:

filling the first firing contact well and filling the second firing contact well, wherein the firing contacts pack comprises a first firing contact and a second firing contact;

filling a firing contacts channel; and completing the preparation of the firing contacts pack.

17. The method of claim 16, wherein the step of coupling the explosive firing train with the dual initiation structure further comprising:

aligning the first snap groove with the first snap hook, and aligning the second snap groove with the second snap hook; and seating the bottom side of the detonating link holder against a top side of the firing contacts substrate, wherein the detonating link holder and the firing contacts substrate are coupled.

18. The method of claim 17, wherein the step of coupling the dual initiation structure with the strip of explosive charge further comprising:

applying a means for strip explosive coupling and covering the bottom side of the firing contacts substrate while maintaining the first firing contact to be uncovered and maintaining the second firing contact to be uncovered;

placing the dual initiation structure in a center of a top surface of the strip of explosive charge;

ensuring that a first surface area of the first firing contact abuts the top surface of the strip of explosive charge and ensuring that a first surface area of the second firing contact abuts the top surface of the strip of explosive charge; and ensuring that a second surface area of the first firing contact is exposed and does not abut the top surface of the strip of explosive charge and ensuring that a second surface area of the second firing contact is exposed and does not abut the top surface of the strip of explosive charge.

19. The method of claim 18, wherein the step of interfacing the dual initiation structure with the target further comprising:

configuring the strip of explosive charge with a breach pattern for breaching the target, wherein the breach pattern comprises a geometric shape, a polygonal shape, or a free-form shape;

disposing a means for interfacing with the target between a bottom surface of the strip of explosive charge and a surface of the target; and emplacing the dual initiation structure in close proximity to the target.

* * * * *